United States Patent [19]

Bowman et al.

[11] Patent Number: 4,636,706
[45] Date of Patent: Jan. 13, 1987

[54] GENERATOR VOLTAGE REGULATING SYSTEM

[75] Inventors: William E. Bowman; Richard J. Voss, both of Kokomo; Thomas E. Kirk, Anderson, all of Ind.

[73] Assignee: General Motors Corporation, Detroit, Mich.

[21] Appl. No.: 775,172

[22] Filed: Sep. 12, 1985

[51] Int. Cl.[4] .................................................. H02J 7/14
[52] U.S. Cl. ......................................... 322/28; 320/21; 322/29; 322/73
[58] Field of Search ........................ 322/28, 35, 72, 73, 322/100, 29; 320/1, 21; 363/17, 59; 307/571, 578, 109, 110

[56] References Cited

U.S. PATENT DOCUMENTS

| 2,976,473 | 3/1961 | Shaw et al. | 322/28 |
| 3,646,369 | 2/1972 | Fujimoto | 307/482 X |
| 3,742,260 | 6/1973 | Boudry | 307/584 X |
| 3,808,468 | 4/1974 | Ludlow et al. | 307/578 |
| 4,054,820 | 10/1977 | Foster | 318/341 |
| 4,110,968 | 9/1978 | Berney | 318/129 |
| 4,146,264 | 3/1979 | Korzieniewski | 322/35 X |
| 4,259,600 | 3/1981 | Fellrath | 307/270 |
| 4,266,181 | 5/1981 | Muto et al. | 322/28 |
| 4,275,344 | 6/1981 | Mori et al. | 322/28 |
| 4,315,205 | 2/1982 | Mori et al. | 322/28 X |
| 4,335,344 | 6/1982 | Gant | 322/28 X |
| 4,362,982 | 12/1982 | Akita et al. | 320/64 |
| 4,368,417 | 1/1983 | Matsuyama | 322/29 |
| 4,386,310 | 5/1983 | Sievers | 322/28 |
| 4,388,586 | 6/1983 | Lamoth | 322/28 X |
| 4,388,587 | 6/1983 | Lamoth et al. | 322/28 X |
| 4,420,700 | 12/1983 | Fay et al. | 307/571 |
| 4,445,055 | 4/1984 | Biete | 307/571 |
| 4,459,489 | 7/1984 | Kirk et al. | 322/8 X |
| 4,486,702 | 12/1984 | Edwards | 322/28 |
| 4,533,863 | 8/1985 | Luhn et al. | 322/28 |
| 4,586,118 | 4/1986 | Mihalka | 320/1 X |

FOREIGN PATENT DOCUMENTS 1392096 4/1975 United Kingdom .

Primary Examiner—R. J. Hickey
Attorney, Agent, or Firm—C. R. Meland

[57] ABSTRACT

A voltage regulator for regulating the output voltage of a diode-rectified alternating current generator that supplies the electrical loads on a motor vehicle including the storage battery. The voltage regulator has an up-down counter which is incremented when the output voltage of the generator is below a desired regulated value and is decremented when the output voltage of the generator is above the desired regulating value. The magnitude of the count in the counter is repeatedly sampled and used to determine the on time of a semiconductor switch that is connected in series with the field winding to thereby control the duty cycle of the field voltage pulses. The counter is incremented at a lower rate when the speed of the engine that drives the generator is below a predetermined speed than it is when the speed of the engine is above the predetermined speed. When the generator is not rotating, the up-count of the counter is limited to a predetermined value that provides a minimum field voltage duty cycle. The system is capable of sensing either battery voltage or rectifier output voltage and is controlled to automatically switch between battery voltage and rectifier voltage under certain operating conditions.

16 Claims, 6 Drawing Figures

GENERATOR VOLTAGE REGULATING SYSTEM

This invention relates to a generator voltage regulating system and more particularly to a voltage regulating system for a diode-rectified alternating current generator that is used to supply the electrical loads on a motor vehicle including charging the storage battery.

Voltage regulating systems for controlling the field current of a diode-rectified alternating current generator, that supplies the electrical loads on a motor vehicle, are well known to those skilled in the art. One known type of voltage regulator senses the voltage applied to the battery and if this voltage is higher than a desired regulated value a transistor, that controls field current, is switched off. When generator voltage drops below the regulated value the field controlling transistor is switched on. The transistor is repetitively switched on and off in response to sensed voltage changes to thereby cause the output voltage of the generator to be maintained at a predetermined, desired regulated value.

In another type of known voltage regulator the field current is pulse-width modulated at a constant frequency to maintain the output voltage of the generator at a desired regulated value. The pulse width, in this type of system, is a function of the difference between actual generator output voltage and a desired voltage. Examples of this type of regulator are disclosed in the United States patent to Shaw et al. U.S. Pat. No. 2,976,473 and Mori et al. U.S. Pat. No. 4,275,344. British Pat. No. 1,392,096 also discloses pulse-width control of field current and in this patent the voltage reference takes the form of a cyclic staircase waveform.

The voltage regulator of this invention employs pulsewidth modulation of generator field current but does so in a manner that differs from the above-mentioned patents. Thus, the regulator of this invention utilizes digital apparatus that includes an up-down counter which responds to the relative magnitudes of the actual output voltage of the generator and the desired regulated output voltage of the generator. When the actual output voltage of the generator is below the desired regulated value the counter is incremented or counted up and when the actual output voltage is below the desired regulated value the counter is decremented or counted down. The instantaneous count in the counter is used to determine the on time of a semiconductor switch that is connected in series with the field winding of the generator and hence determine the pulse-width of the voltage that is applied to the field. Whenever actual output voltage exceeds the desired regulated value the field controlling semiconductor switch is biased off. Thus, during the time that the actual output voltage is above the desired regulated value the field is not energized and the counter is decremented. When actual output voltage now drops below the desired regulated value the field is energized at the pulse-width represented by the magnitude of the count in the counter and the counter is incremented.

It accordingly is an object of this invention to provide an improved generator voltage regulator and method of generator regulation wherein a counter is incremented when generator output voltage is below a desired regulated value and is decremented when generator output voltage is above the desired regulated value and wherein the field is deenergized as long as generator output voltage exceeds the desired regulated value and further wherein the field voltage is pulse-width modulated at a pulse-width that is a function of the magnitude of the count in the counter during the time that generator output voltage is less than the desired regulated value.

Another object of this invention is to provide a motor vehicle electrical system wherein a generator that supplies the electrical loads on the vehicle, and which is driven by the engine vehicle, is voltage regulated by controlling field current by the digital regulating apparatus that has been described and further wherein the regulating apparatus is so controlled as to minimize the increased torque load that is applied to the engine by the generator when a large electrical load is applied to the generator at the time that the engine and generator are operating at a low speed such as engine idle speed. This object is preferably carried out by varying the counting rate of the up-down counter of the voltage regulator such that the up-counting rate is reduced during engine idle. This has the effect of reducing the time rate of change of the field voltage pulse-width when generator output voltage is below the desired regulated value. Accordingly, during engine idle, field current is gradually increased so as not to impose a sudden torque load on the engine when a large electrical load is applied to the generator. During engine speeds above idle speed the counting rate is increased to a predetermined value.

Still another object of this invention is to provide a voltage regulating system for controlling the field current of a diode-rectified alternating current generator that supplies the electrical loads on a motor vehicle including the storage battery that has an improved voltage sensing selector arrangement that is capable of providing a sense voltage to the voltage regulator which represents either battery voltage or the output voltage of the bridge rectifier of the diode-rectified alternating current generator. The object is preferably carried out by providing two voltage divider circuits, one of which senses battery voltage and the other of which senses the bridge rectifier output voltage of the diode-rectified alternating current generator. Each voltage divider is comprised of a plurality of resistors and a temperature sensitive thermistor. When a line, that senses battery voltage, has a voltage that is below a predetermined value the sense selector applies the voltage from the voltage divider connected to the alternator bridge rectifier to the voltage regulator. When battery voltage is above the predetermined value the sense selector applies the voltage from the voltage divider that is connected to the battery to the voltage regulator.

Another object of this invention is to provide a digital voltage regulating system for a diode-rectified alternating current generator that supplies the electrical loads on a motor vehicle that includes an up-down counter wherein the system is arranged such that when the engine of the vehicle is not driving the generator the magnitude of the count that can be attained by the counter, when the counter is counting up, is clamped to a predetermined value. The clamped count value in the counter is used to determine the field voltage pulse width under this condition of operation and the pulse width is of such a value as to limit field current to a predetermined value.

Another object of this invention is to provide an improved fault detecting system for a motor vehicle electrical system that uses active fault detection apparatus.

IN THE DRAWINGS

Figure 1:
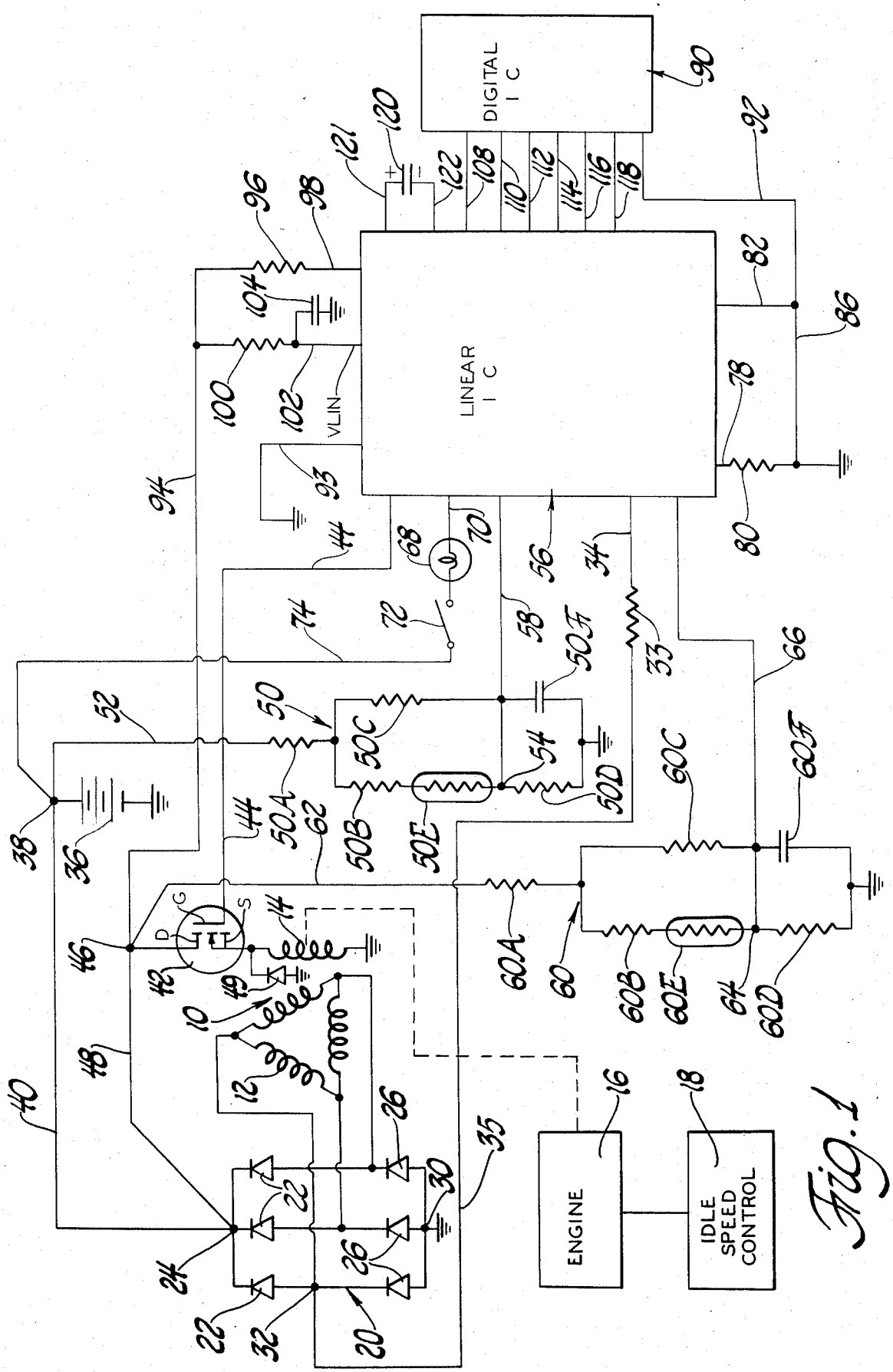
FIG. 1 is a schematic circuit diagram of a voltage regulating system for a motor vehicle electrical system made in accordance with this invention.

Referring now to the drawings and more particularly to FIG. 1, a motor vehicle electrical system is illustrated which utilizes a voltage regulating system made in accordance with this invention. The system of FIG. 1 has an alternating current generator which is generally designated by reference numeral 10. This alternating current generator has a three phase Delta connected stator winding 12 and a rotatable field winding 14. The generator may be of the type disclosed in the United States patent to Cheetham et al. U.S. Pat. No. 3,538,362 with the exception that the generator in FIG. 1 has a Delta connected stator winding rather than a Y-connected stator winding shown in U.S. Pat. No. 3,538,362. The voltage regulating system of this invention can be used with generators that have either Delta or Y-connected stator windings. The field winding 14 is part of a rotor assembly which is rotatably driven by the engine of the motor vehicle which has been designated by reference numeral 16. The engine 16 is shown connected to an idle speed control 18 which controls the idle speed of the engine 16. The generator is driven at a higher speed than the speed of the engine by a belt and pulleys in a well known manner.

The output terminals of the three phase stator winding 12 are connected respectively to AC input terminals of a three phase full-wave bridge rectifier generally designated by reference numeral 20. The bridge rectifier is comprised of three positive semiconductor diodes 22 which have their cathodes connected to a direct voltage output terminal 24. The bridge rectifier 20 has three negative semiconductor diodes 26, the anodes of which are connected to a grounded direct current output terminal 30 of the bridge rectifier 20. The junction 32, that is connected between a pair of positive and negative diodes, is connected to a conductor 34 via resistor 33 and conductor 35. The voltage that is developed at junction 32 is a pulsating voltage and the frequency of the voltage pulses developed at this junction is a function of generator and engine speed. When the generator is not rotating it does not generate an output voltage and the voltage at junction 32 is zero. The signal on line 34 therefore represents generator and engine speed and also indicates whether or not the generator is rotating. This signal is utilized to control the voltage regulating system of this invention in a manner which will be more fully described hereinafter.

The motor vehicle electrical system includes a storage battery 36, the negative side of which is grounded and the positive side of which is connected to junction 38. The battery will be assumed to be a 12 volt storage battery in the description of this invention. The battery 36 is charged by a circuit that includes a conductor 40 that connects the direct voltage output terminal 24 of the bridge rectifier 20 to the junction 38. The battery and generator feed various electrical loads on the motor vehicle, which have not been illustrated but which are connected between junction 38 and ground.

The voltage regulating system of this invention controls the current through field winding 14 to regulate the voltage appearing between junction 38 and ground to a desired regulated value. In describing this invention it will be assumed that the system is a 12 volt system and that the desired regulated voltage that is to be maintained between junction 38 and ground is 14 volts. This desired regulated voltage will vary with temperature.

The current, through field winding 14, is controlled by a semiconductor switching device which takes the form of a metal oxide semiconductor field effect transistor 42. This transistor is an N-channel enhancement mode type of transistor. The transistor 42 has a gate G connected to conductor 44, a drain D connected to junction 46 and a source S connected to one side of field winding 14. The opposite side of field winding 14 is connected to ground. The junction 46 is connected to the positive direct voltage output terminal 24 of the bridge rectifier 20 via conductor 48. A field discharge diode 49 is connected across field winding 14.

When the transistor 42 is biased conductive, between its drain and source, the field winding 14 will be energized via a circuit that can be traced from the positive direct voltage output terminal 24, through conductor 48 to junction 46, through the drain and source electrodes of transistor 42 and then through the field winding 14 to ground. The transistor 42 is switched on and off, in a manner to be described, in order to maintain the voltage at junction 38 at the desired regulated value whch has been assumed to be 14 volts. The field winding 14 can also be energized from battery 36 via conductors 40 and 48 and transistor 42.

The voltage regulator has a battery voltage sensing circuit, generally designated by reference numeral 50, which is connected between junction 38 and ground. This voltage sensing circuit comprises resistors 50A, 50B, 50C, 50D, a temperature responsive thermistor 50E having a negative temperature coefficient of resistance and a capacitor 50F. This voltage dividing sensing circuit 50 is connected to junction 38 via conductor 52 and hence senses the voltage across battery 36. The voltage at junction 54 is a divided down representation of the voltage across battery 36 and is applied to a linear integrated circuit 56 by a conductor 58. The voltage on conductor 58 is therefore a function of battery voltage and this voltage varies in response to temperature changes of the thermistor 50E to provide a temperature compensated regulated voltage. Thus, it has been assumed that the regulator will maintain the voltage at junction 38 at 14 volts but during cold conditions this voltage will be increased and during hot temperature conditions this voltage would be decreased.

The voltage regulator has another voltage sensing circuit generally designated by reference numeral 60 which is connected between junction 46 and ground. This voltage sensing circuit comprises resistors 60A, 60B, 60C, 60D, a temperature sensitive thermistor 60E having a negative temperature coefficient of resistance and a capacitor 60F. This voltage sensing circuit is connected to junction 46 via conductor 62. The junction 64 will develop a divided down representation of the voltage appearing between junction 46 and ground and therefore represents a divided down version of the voltage appearing between the direct voltage output terminal 24 of the bridge rectifier and ground. The voltage at junction 64 is applied to the circuit 56 via a conductor 66.

The circuit 56 includes a sense selector which will be described in detail hereinafter. This sense selector causes the voltage regulator to respond to either a representation of battery voltage on conductor 58 or a representation of bridge rectifier voltage on conductor 66. Under normal conditions the regulator will respond to the battery voltage on conductor 58 but in the event of a malfunction, such as the disconnection of line 52 from junction 38, the voltage regulator will continue to operate by responding to the bridge rectifier voltage on conductor 66. In either case, a temperature compensated regulated voltage will be produced since both voltage dividers 50 and 60 have a temperature sensitive thermistor 50E and 60E.

The voltage regulating system includes a signal lamp 68 that is connected between conductor 70 and a manually operable switch 72, which may be the ignition switch of a motor vehicle. The switch 72 is connected to junction 38 via a conductor 74. As will be explained, the signal lamp 68 is energized during certain malfunction conditions to indicate to the operator of the motor vehicle that a malfunction has occurred.

The linear integrated circuit 56 is connected to conductor 34 which provides a pulse frequency to the circuit 56 that is a function of engine and generator speed. The integrated circuit 56 is connected to conductor 44 which, as mentioned, is connected to the gate of the transistor 42.

The circuit 56 has a power ground conductor 78. The conductor 78 is connected to motor vehicle ground via a resistor 80. The circuit 56 further has a conductor 82 which forms a signal ground connection for circuit 56. The signal ground conductor 82 is connected to motor vehicle ground via conductor 86 and is connected to a digital integrated circuit generally designated by reference numeral 90 via conductor 92.

Figure 2:
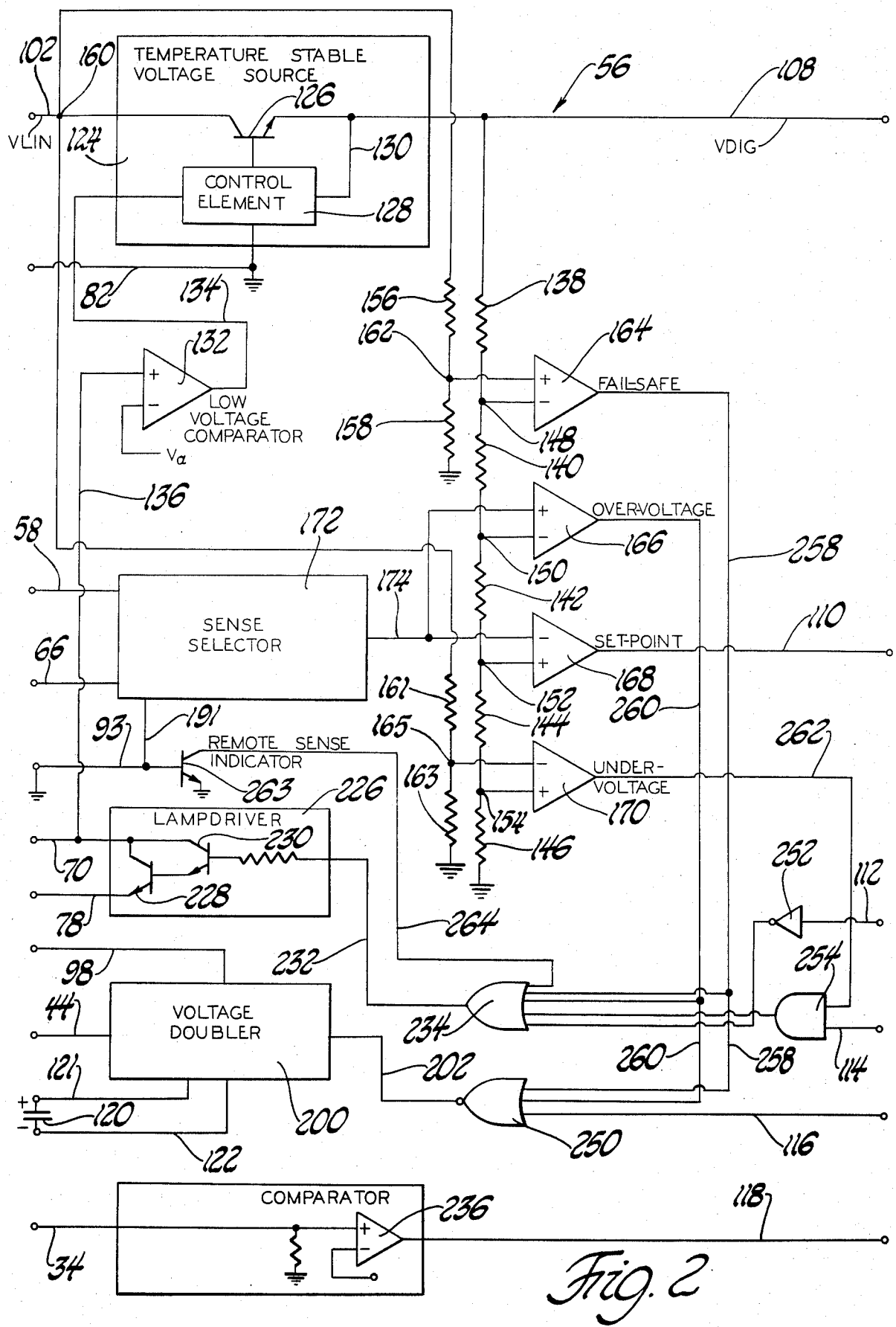
FIG. 2 is a schematic circuit diagram of the linear integrated circuit chip which forms a part of the system illustrated in FIG. 1.

The circuit 56 has a so-called remote sense conductor 93 which is shown connected to ground in FIGS. 1 and 2. When the regulator is manufactured, conductor 93 will either be connected to signal ground and hence to vehicle ground, as shown, or alternatively the conductor 93 can be allowed to float or in other words is not connected to ground. The manner in which conductor 93 is connected during manufacture of the regulator, that is, grounded or not grounded, determines whether or not the system will be capable of energizing signal lamp 68 in the event that the battery sensing conductor 52 becomes inadvertently disconnected from junction 38. Where the battery is located in a remote location, such as in the trunk of a motor vehicle, it is desirable to be able to indicate to the driver of the vehicle that the sensing conductor 52 has become disconnected from junction 38 by causing the signal lamp 68 to be energized. When such an indication is desired the conductor 93 is not connected to ground. If it is not desired that an indication be given, the conductor 93 is grounded. The manner in which the system is implemented, to provide the function just described, will be described in more detail hereinafter.

The junction 46, which is connected to conductor 48 and to bridge rectifier output terminal 24, is connected to a conductor 94. The voltage on conductor 94 is substantially the same as the desired regulated voltage at bridge rectifier output terminal 24. The circuit 56 is connected to conductor 94 via a resistor 96 and a conductor 98. As will be more fully described hereinafter, the conductor 98 supplies voltage to a voltage doubler that is utilized in the system. The circuit 56 is further connected to line 94 via resistor 100 and conductor 102. A capacitor 104 is connected between conductor 102 and ground. The voltage on conductor 102 has been identified as voltage VLIN.

The linear integrated circuit 56 and the digital integrated circuit 90 are interconnected by conductors 108, 110, 112, 114, 116 and 118. As will be more fully described, the conductor 108 applies a regulated voltage VDIG to the digital integrated circuit 90. The conductor 110 applies a set-point signal to the digital integrated circuit 90. The conductor 112 applies a signal to circuit 56 from circuit 90 that is indicative of whether or not the generator is rotating. The line 114 applies a signal to circuit 56 from circuit 90 that is indicative of a high speed condition of the engine and generator. The line 116 supplies a signal from the circuit 90 to the circuit 56 that controls the pulse width or on time of the transistor 42. The line 118 supplies a square wave signal to the circuit 90, the frequency of which is a function of engine and generator speed.

As previously mentioned, the system of this invention utilizes a voltage doubler. The capacitor for this voltage doubler is illustrated in FIG. 1 and designated by reference numeral 120. This capacitor is connected to the circuit 56 by conductors 121 and 122 in a manner to be more fully described.

Figure 3:
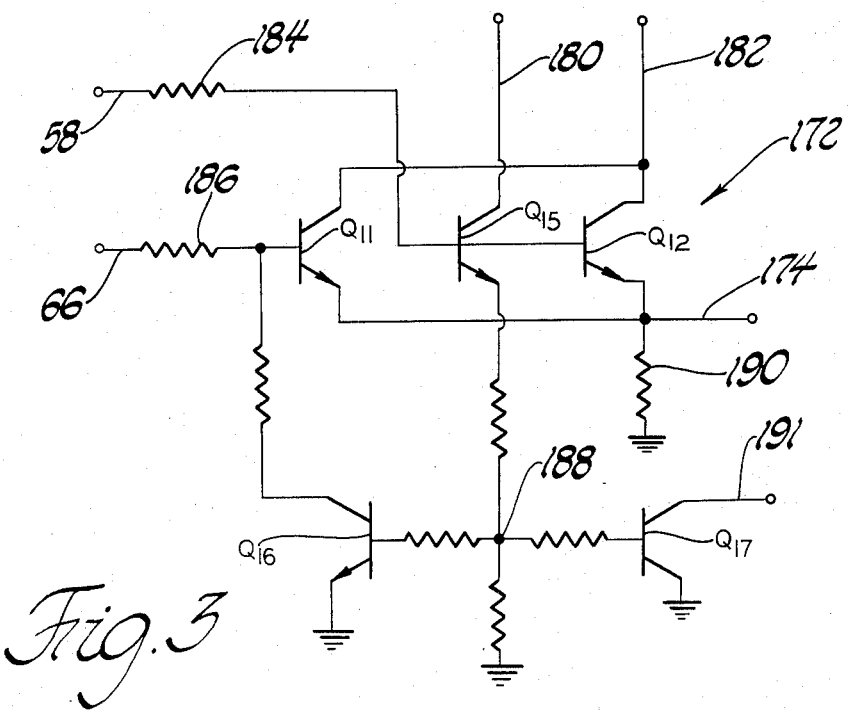
FIG. 3 is a schematic circuit diagram of the sense selector illustrated in block diagram form in FIG. 2.
Figure 4:
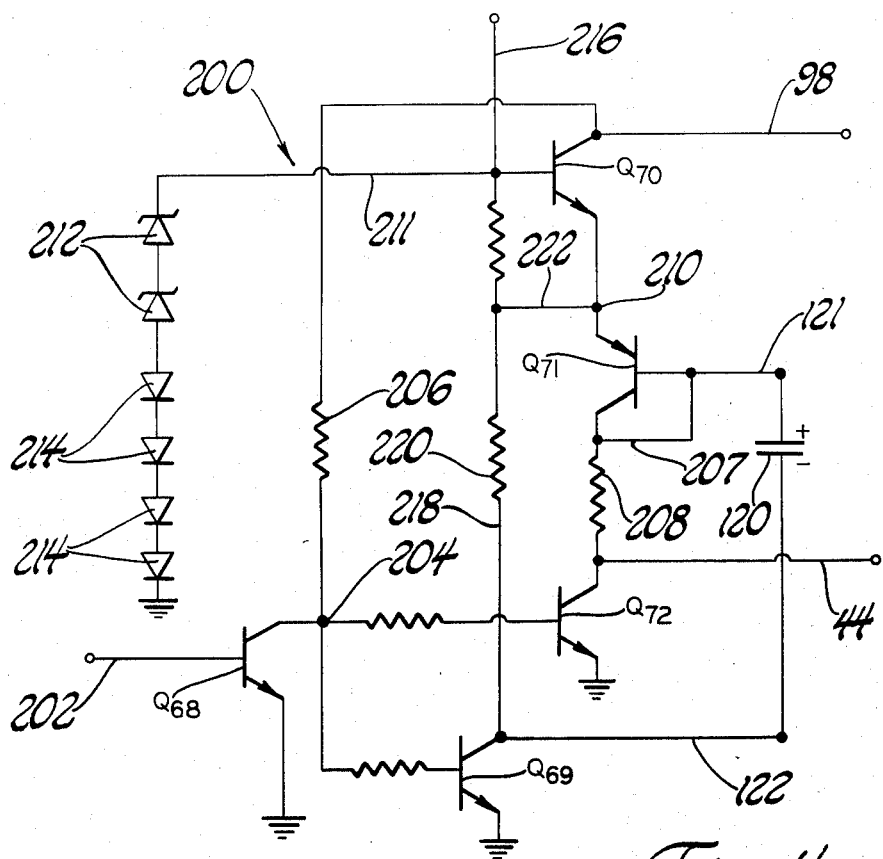
FIG. 4 is a schematic circuit diagram of the voltage doubler that is illustrated in block diagram form in FIG. 2.

The linear integrated circuit 56 is illustrated in FIG. 2 and the specific circuitry for the sense selector and voltage doubler, shown as blocks in FIG. 2, are illustrated in detail in FIGS. 3 and 4.

The circuit 56, which is illustrated in FIG. 2, will now be described. In FIG. 2, various points in the circuit have been designated by the normal ground symbol. These symbols indicate that the particular grounded point in the circuit is connected both to signal ground and motor vehicle ground although, as pointed out previously, signal ground for circuit 56 is connected to motor vehicle ground by conductor 82. It is to be understood that circuit 56 is connected to the system, illustrated in FIG. 1, by conductors which have been identified by the same reference numerals in FIGS. 1 and 2. The voltage VLIN on conductor 102 is applied to the input of a temperature stable voltage source or internal voltage regulator 124. The purpose of the voltage regulator 124 is to maintain a substantially constant voltage VDIG of about 8 volts on conductor 108. The voltage regulator 124 has been illustrated somewhat schematically since regulators of this type are well known to those skilled in the art. Thus, the regulator comprises an NPN transistor 126 connected in series between the conductors 102 and 108. The base of the transistor is connected to a control element 128 which serves to control the conduction of transistor 126. The control element responds to the voltage on conductor 108 via conductor 130 and controls the conduction of transistor 126 to maintain the regulated voltage on conductor 108. The control element 128 also responds to the output of a low voltage comparator 132 via line 134. The voltage comparator 132 compares the voltage on conductor 70 with a reference voltage $V_a$. The conductor 70 is connected to one side of the signal lamp 68 and is connected to the voltage comparator 132 by conductor 136. If the voltage on conductor 136 does not exceed a certain minimum predetermined value the output of the low voltage comparator 132 will cause the control element 128 to bias the transistor 126 nonconductive to thereby disconnect conductors 102 and 108. If the voltage on conductor 136 exceeds the predetermined minimum value the transistor 126 is controlled to conduct to thereby cause a regulated voltage to be developed on conductor 108.

The circuit 56 has a voltage divider comprised of resistors 138, 140, 142, 144 and 146 which are connected in series between conductor 108 and ground. This voltage divider provides divided down progressively lower voltages at junctions 148, 150, 152 and 154. The voltages at all of these junctions are stable voltages since the voltage divider is connected to the stable voltage VDIG on line 108. The circuit 56 has additional voltage dividers comprised of resistors 156 and 158 and resistors 161 and 163 which are connected between junction 160 and ground. The voltages at junctions 162 and 165 are each a divided down representation of voltage VLIN.

The circuit of FIG. 2 has a fail-safe comparator 164, an over-voltage comparator 166, a set-point comparator 168 and an under-voltage comparator 170.

As previously mentioned, the voltage regulator of this invention is capable of responding to either a divided down representation of battery voltage on conductor 58 or a divided down representation of bridge rectifier output voltage on conductor 66. This is accomplished by a sense selector designated by reference numeral 172. The sense selector is shown in detail in FIG. 3, which will be described. It can be seen, from FIGS. 2 and 3, that the sense selector is connected with conductors 58 and 66 and is connected with the set-point comparator 168 by a conductor 174. The detailed circuit of the sense selector 172 is illustrated in FIG. 3 and comprises conductors 180 and 182 which have the voltage VDIG applied thereto. The circuit of FIG. 3 utilizes NPN transistors $Q_{11}$, $Q_{12}$, $Q_{15}$, $Q_{16}$ and $Q_{17}$. The conductor 58 (battery voltage) is connected to the bases of transistors $Q_{15}$ and $Q_{12}$ via a resistor 184. The conductor 66 (bridge rectifier voltage) is connected to the base of transistor $Q_{11}$ via a resistor 186. The base electrodes of transistors $Q_{16}$ and $Q_{17}$ are connected to a junction 188 which in turn is connected to ground by a resistor. The emitters of transistors $Q_{11}$ and $Q_{12}$ are connected to conductor 174 and to ground via a resistor 190. The collector of transistor $Q_{16}$ is connected to the base of transistor $Q_{11}$ and the emitters of transistors $Q_{16}$ and $Q_{17}$ are grounded. The collector of transistor $Q_{17}$ is connected to the conductor 191. The conductor 191 is supplied with voltage from voltage VDIG (conductor 108) by circuitry that is not illustrated.

The transistor $Q_{15}$ senses the voltage appearing between conductor 58 and ground (battery voltage) and when this voltage is above a predetermined level the transistor $Q_{15}$ is biased conductive. The voltage level required to cause transistor $Q_{15}$ to conduct may be about 4 to 6 volts. Assuming that battery voltage (12 volts) has been applied to conductor 58 the transistor $Q_{15}$ will be biased to conduct. The conduction of transistor $Q_{15}$ will cause transistors $Q_{16}$ and $Q_{17}$ to be biased conductive. With transistor $Q_{16}$ biased to conduct, the base voltage of transistor $Q_{11}$ is lowered to a point where it is biased nonconductive. The conduction of transistor $Q_{17}$ lowers the voltage of conductor 191 toward ground potential. In the condition of operation that has just been described, transistor $Q_{12}$ operates as a voltage follower to thereby apply a voltage to conductor 174 and set-point comparator 168 that represents the voltage at conductor 58 or in other words, the conductor 174 is now sensing battery voltage.

If the voltage at conductor 58 drops to a point where transistor $Q_{15}$ is no longer biased to conduct (below 4 to 6 volts) the circuit will cause a voltage to be developed on conductor 174 that is representative of the alternator or bridge rectifier voltage on conductor 66. The voltage on conductor 58 may be lowered, for example, by a disconnection of sensing line 52 from junction 38 in which case the voltage on conductor 58 would be zero. When the voltage on conductor 58 drops to a value that biases transistor $Q_{15}$ nonconductive, transistors $Q_{16}$ and $Q_{17}$ will be biased nonconductive. Transistor $Q_{11}$ will now be biased into conduction and it now operates as a voltage follower to provide a voltage on conductor 174 that is substantially equal to the voltage on conductor 66. Moreover, with transistor $Q_{17}$ biased nonconductive the voltage on conductor 191 will go high. The set-point comparator 168 will now have bridge rectifier voltage applied to it and accordingly the regulator will regulate the output voltage in response to bridge rectifier output voltage.

The voltage doubler 200 is illustrated in block diagram form in FIG. 2 and in detail in FIG. 4. The purpose of the voltage doubler 200 is to develop a voltage that is applied to the gate of the MOSFET transistor 42 that is high enough to bias this transistor conductive. Thus, the 12 volts that is available in the system must be increased above 12 volts to bias the transistor 42 fully conductive. The reason for this is that the field winding 14 is connected between the source of transistor 42 and ground and the fact that transistor 42 is an N-channel enhancement type. Putting it another way, the field winding is energized by transistor 42 in a high side drive configuration. The voltage doubler 200 is connected to conductor 98 and therefore has the voltage at junction 24 applied to it. The voltage doubler 200 is further connected to a conductor 202 which has a signal developed thereon that will cause the transistor 42 to be biased either conductive or nonconductive.

The voltage doubler circuit 200 is illustrated in detail in FIG. 4 and it comprises a pair of NPN transistors $Q_{70}$ and $Q_{72}$. The collector of transistor $Q_{70}$ is connected to conductor 98 and to a junction 204 through a resistor 206. The junction 204 is connected to the base of transistor $Q_{72}$ through a resistor, to the base of transistor $Q_{69}$ through a resistor, and is connected to the collector of transistor $Q_{68}$. The emitter of transistor $Q_{68}$ is grounded and the base of this transistor is connected to conductor 202. The circuit of FIG. 4 further includes a PNP transistor $Q_{71}$ having an emitter connected to the emitter of transistor $Q_{70}$ and a base connected to conductor 121. The base and collector of transistor $Q_{71}$ are connected by a conductor 207 and a resistor 208 connects the collectors of transistors $Q_{71}$ and $Q_{72}$. The emitter-base circuit of transistor $Q_{71}$ provides a diode having its anode connected to junction 210 and a cathode connected to conductor 121. A circuit that includes conductor 211, Zener diodes 212 and forward biased diodes 214 is connected between the base of transistor $Q_{70}$ and ground. This circuit limits the voltage between conductor 211 and ground to about 18 volts. The transistor $Q_{70}$ is continuously biased conductive and essentially operates as a diode with gain. The conductor 216 is connected to the voltage VLIN through circuitry, which has not been illustrated.

The operation of the voltage doubler 200 will now be described. The voltage on conductor 202 will switch high and low to cause the transistor 42 to be biased conductive and nonconductive. Assuming that the voltage on conductor 202 is in a low state, the transistor $Q_{68}$ will be biased nonconductive. With transistor $Q_{68}$ in a nonconductive state transistors $Q_{72}$ and $Q_{69}$ will be biased conductive. The voltage doubler capacitor 120 will now be charged via a circuit that can be traced from conductor 98 through the conducting collector-emitter circuit of transistor $Q_{70}$, through the emitter-base diode of transistor $Q_{71}$, through capacitor 120 and through conducting transistor $Q_{69}$ to ground. The conduction of transistor $Q_{72}$ causes the voltage at conductor 44 to approach ground potential and since conductor 44 is connected to the gate of transistor 42 the gate of transistor 42 approaches ground potential and accordingly transistor 42 is biased nonconductive. The condition of the circuit that has just been described corresponds to a condition where the voltage regulator has determined that the transistor 42 should be in a nonconductive state.

When the voltage regulating system requires that the transistor 42 be biased conductive the voltage on conductor 202 is raised or goes high in order to bias transistor $Q_{68}$ conductive. With transistor $Q_{68}$ conductive, transistors $Q_{69}$ and $Q_{72}$ are biased nonconductive. A voltage is now applied to conductor 44 and to the gate of transistor 42 which is substantially the sum of the voltage accumulated on capacitor 120 and the voltage on conductor 98 which is substantially the output voltage of the bridge rectifier on line 94. Thus, when transistor $Q_{72}$ is biased nonconductive, the positive side of capacitor 120 is connected to conductor 44 via conductor 207 and resistor 208. The negative side of capacitor 120 is now connected to the positive voltage on conductor 98 via conductor 122, conductor 218, resistor 220, conductor 222 and the collector-emitter path of transistor $Q_{70}$. As a result of this, the voltage accumulated on capacitor 120 is added to the voltage between conductor 98 and ground with the result that a sufficient voltage is applied to the gate electrode of transistor 42 to bias it conductive. When the output voltage of the bridge rectifier 20 on line 94 is about 14 volts the voltage applied to the gate of transistor 42 will be doubled to about 28 volts. When only battery voltage (12 volts) is applied to conductor 94 the voltage applied to the gate of transistor 42 will be doubled to about 24 volts. The resistor 96 limits the charging current to capacitor 120.

The circuit of FIG. 2 has a lamp driver circuit 226 that is comprised of NPN transistors 228 and 230 connected, as illustrated. The collectors of these two transistors are connected to conductor 70 which in turn is connected to one side of lamp 68. The emitter of transistor 228 is connected to conductor 78 that in turn is connected to motor vehicle or power ground through a current limiting resistor 80, as shown in FIG. 1. The base of transistor 230 is connected to a conductor 232 which is connected to the output of an OR gate 234. When the output of OR gate 234 goes high, transistors 230 and 228 are biased conductive to thereby energize the signal lamp 68 through resistor 80.

The circuit 56 has a comparator designated by reference numeral 236. The output of this comparator is connected to line 118 and its input is connected to conductor 34. The comparator 236 operates as a squarer to provide square wave pulses on line 118 that have the same frequency as the voltage transitions at the junction 32 of bridge rectifier 20.

The linear integrated circuit 56 has a NOR gate 250, an inverter 252 and an AND gate 254, all connected as illustrated in FIG. 2.

The functions of the circuit illustrated in FIG. 2 will now be described. When an operator of a motor vehicle closes the switch 72 the low voltage comparator 132 will sense the voltage at the lamp conductor 70 and if this voltage is normal it will cause the internal voltage regulator 124 to switch on to thereby cause a regulated voltage to be applied to conductor 108 from conductor 102.

The set-point comparator 168 compares the voltage at junction 152 (reference voltage) with the sense voltage on conductor 174. The voltage on conductor 174 can either be a representation of battery voltage or a representation of bridge rectifier voltage, depending upon which voltage has been selected by sense selector 172. When the sense voltage on conductor 174 is greater than the voltage on junction 152 the output on conductor 110 is low or zero. If the sense voltage on conductor 174 is less than the reference voltage at junction 152 the comparator develops a high or 1 output. The voltage on conductor 110 therefore goes high and low, depending upon whether the voltage that is being sensed is either higher or lower than the voltage reference. This comparator is the primary control for the voltage regulator and, as will be more fully described hereinafter, the signal on line 110 is applied to the digital integrated circuit 90 to develop a pulse width modulated control of the on/off times of the transistor 42.

The fail-safe comparator 164 compares the voltages at junctions 162 and 148. The voltage at junction 162 is a divided down representation of the voltage VLIN and the voltage at junction 148 is a divided down version of voltage VDIG. The voltage at junction 148 is higher or scaled up from the set-point reference voltage on junction 152. If the voltage at junction 162 is greater than the voltage at junction 148 the comparator 164 develops an output which is applied to a line or conductor 258 that is connected as one input to the OR gate 234 and as one input to NOR gate 250. Under this condition of operation the development of the signal on conductor 258 will, via NOR gate 234, cause the lamp driver 226 to become conductive to energize the signal lamp 68. In addition, under this condition of operation the output of the gate 250, which is applied to conductor 202, goes low thereby biasing transistor $Q_{68}$ (FIG. 4) nonconductive which in turn causes transistors $Q_{72}$ and $Q_{69}$ to be biased conductive with the result that the voltage doubler 200 is turned off so that the transistor 42 is biased to a nonconductive state.

The purpose of the fail safe comparator 164 and associated circuitry is to permit the regulator to regulate at a higher voltage than the desired regulated voltage of 14 volts in the event that conductor 40 becomes disconnected from junction 38 or becomes disconnected from output terminal 24. If such a disconnection occurs the bridge rectifier 20 is no longer connected to the battery and therefore is not applying a voltage to the battery. Since the regulator now senses only battery voltage, which is below the desired regulated voltage value, the set-point comparator 168 develops a signal on line 110 which tends to bias transistor 42 continuously conductive to apply continuous field current. If this condition were allowed to persist, the generator output voltage would increase to such a level that it would destroy components of the system. When the field winding is energized, as described, the output voltage of the generator will increase but when the voltage VLIN on conductor 102 reaches about 20 to 25 volts the fail safe comparator develops a signal on line 258 which, through the NOR gate 250 and voltage doubler 200, causes the transistor 42 to be biased nonconductive. With field current cutoff, the generated output voltage decreases and when it drops below the 20 to 25 volt range the output of comparator 164 is such as to cause the field controlling transistor 42 to be biased conductive. In this manner the output voltage of the generator is regulated to the 20 to 25 volt range.

The over-voltage comparator 166 compares the voltage at junction 150 with voltage on conductor 174 which is either battery voltage on conductor 58 or bridge rectifier voltage or conductor 66. The over-voltage reference voltage on junction 150 is higher or is scaled up from the set-point reference voltage on junction 152. If the voltage on conductor 174 exceeds the voltage on junction 150 the over-voltage comparator develops an output on line 260 which is applied as an input to the NOR gate 250 and to the OR gate 234. The output of OR gate 234 now causes signal lamp 68 to be energized via lamp driver 226 and the output of NOR gate 250 now actuates the voltage doubler 200 to bias field controlling transistor 42 nonconductive. With transistor 42 nonconductive, generator output voltage decreases as does the voltage on conductor 174. As the voltage on conductor 174 goes below the over-voltage reference voltage at junction 150 the output of comparator 166 changes state to thereby cause field controlling transistor 42 to be biased conductive. The regulator now regulates the output voltage to a value that is higher than the desired regulated or set-point value. By way of example, and not by way of limitation, if the desired generator output voltage to be maintained is 14 volts at a particular temperature, the over-voltage comparator 166 can be actuated to produce an over-voltage signal on line 260 when the output voltage reaches about 16 volts. Putting it another way, comparator 166 can be triggered when the generator output voltage is about 2 volts above the desired regulated value. The over-voltage comparator is intended to operate when a failure occurs in the voltage regulator which causes excessive field current and where the conductors 40 and 52 are properly connected. One example of this would be a shorted field controlling transistor 42.

The under-voltage comparator 170 compares the reference voltage at junction 154 with the voltage on junction 165. When the generator voltage is not abnormally low the voltage at junction 154 is lower than the voltage on junction 165. If the voltage on junction 165 goes lower than the voltage on junction 154 the output of the under-voltage comparator develops a signal on line 262 that is applied as one input to AND gate 254. The other input to AND gate 254 is the high speed signal on line 114 which goes to a high or 1 level when generator speed is higher than a predetermined speed of, for example, 3000 rpm. During an under-voltage condition and generator speed above a predetermined speed the output of AND gate 254, which is applied as an input to the OR gate 234, causes the lamp driver circuit 226 to be driven to a conductive state to thereby energize the signal lamp 68. If the generator speed is below the predetermined speed (3000 rpm) the signal on high soeed line 114 goes low and if an under-voltage condition now exists, the signal lamp 68 is not energized. The under-voltage condition can be one in which the voltage at bridge rectifier output terminal 24 drops below approximately 11 volts.

It has been previously mentioned that the remote sense conductor 93 (FIGS. 1 and 2) can be connected to ground or not connected to ground. If conductor 93 is not connected to ground, signal lamp 68 will be energized if sensing lead 52 becomes disconnected from junction 38. If conductor 93 is connected to ground, as has been illustrated in FIGS. 1 and 2, the signal lamp 68 will not be energized if sensing lead 52 becomes disconnected from junction 38. This is implemented by a circuit, (shown in FIG. 2) that includes a remote sense indicator NPN transistor 263. The emitter of this transistor is grounded and its base is connected to remote sense lead 93. The base of transistor 263 is connected to conductor 191 that in turn is connected to the collector of transistor $Q_{17}$ (FIG. 3) of sense selector 172. Assuming that the regulator has been manufactured so that remote sense lead 93 is not grounded and that sensing lead 52 is disconnected from junction 38, the sense selector is switched to a condition wherein transistor $Q_{17}$ is biased nonconductive to cause the collector potential of transistor $Q_{17}$ and conductor 191 to go high. The voltage on conductor 191 biases transistor 263 conductive so that the voltage level on line 264 goes low. The line 264 is connected to voltage VLIN through one collector of a multiple collector PNP transistor, which is not illustrated. The line 264 is one input to OR gate 234 and when the voltage on line 264 goes low the output of OR gate 234 causes lamp 68 to be energized.

When conductor 93 is grounded, the base of transistor 263 is always at a low level so that transistor 263 is always biased nonconductive and the voltage on conductor 264 is high so that lamp 68 is not energized. This condition of operation will not change in the event that sensing lead 52 becomes disconnected from junction 38.

In FIG. 2 the rotation signal on line 112 is applied as an input to the OR gate 234 through inverter 252. When the generator is not rotating, the rotation signal is of such a logic level that the OR gate 234 develops an output which causes lamp driver circuit 226 to energize the signal lamp 68. This serves as a bulb continuity check for lamp 68 when the operator of the vehicle initially closes switch 72. When the generator is rotating, the signal on line 112 changes state and is such as to cause lamp 68 to be deenergized.

Figure 5:
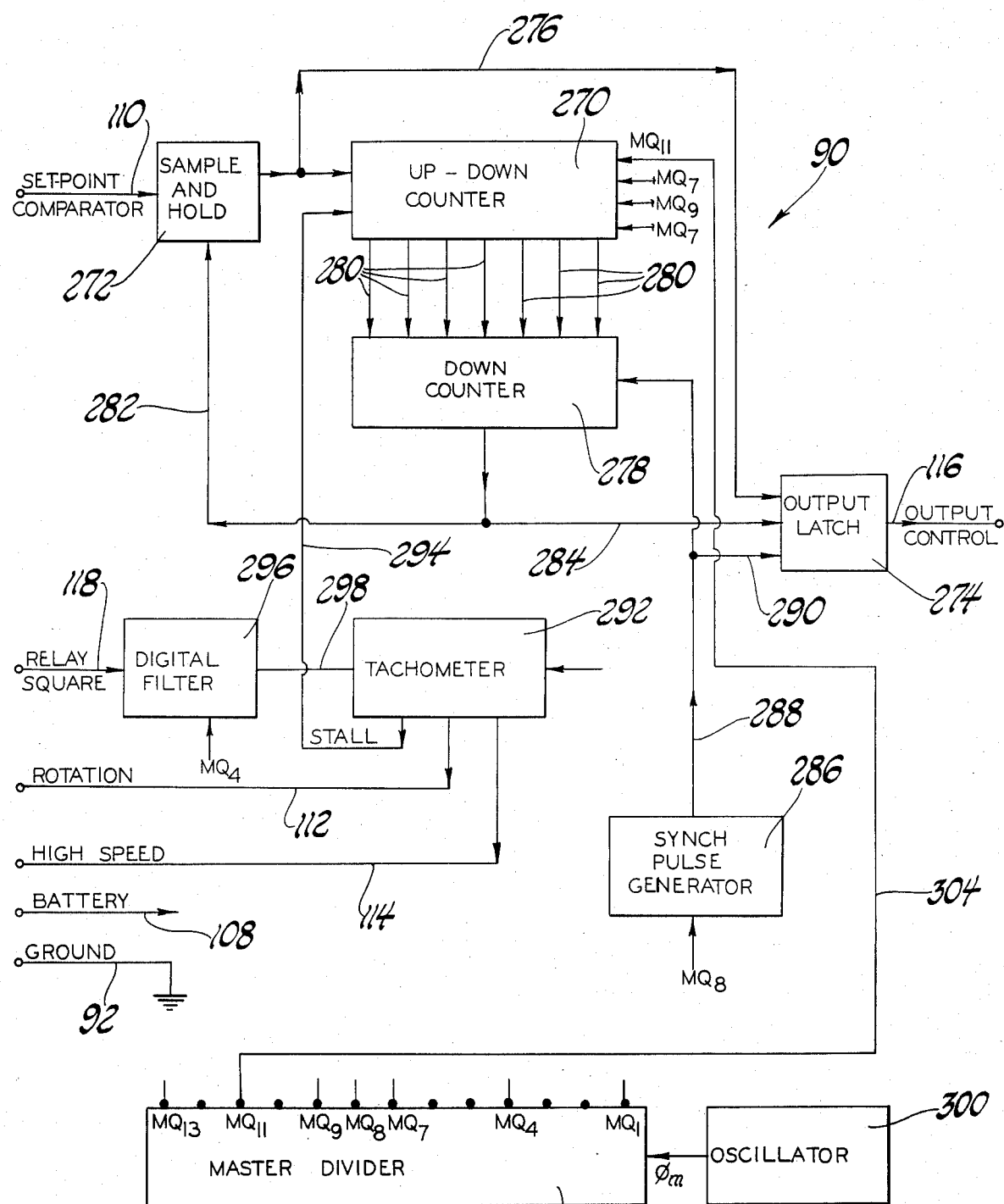
FIG. 5 is a block diagram which illustrates the operation of the digital integrated circuit illustrated in FIG. 1.
Figure 6:
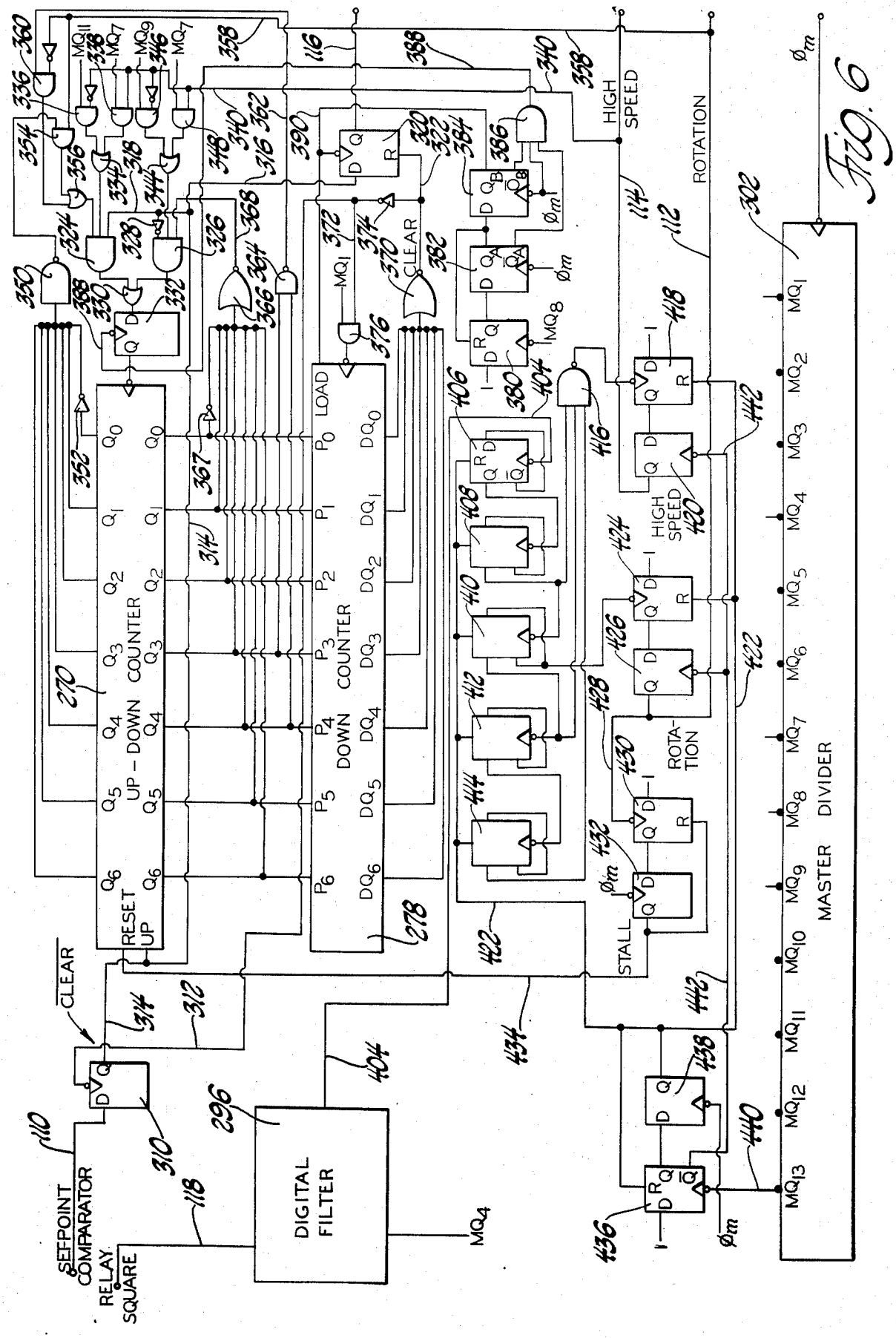
FIG. 6 is a more detailed logic diagram of the digital integrated circuit shown in FIGS. 1 and 5.

The integrated digital circuit 90 is illustrated in block diagram form in FIG. 5 and in detail in FIG. 6. Before proceeding to a description of circuit 90 it will be helpful to an understanding of this invention to generally describe some of the operation of circuit 90. One of the inputs to circuit 90 is the output of the set-point comparator 168 that is applied to circuit 90 by conductor 110. The signal on line 110 (high or low) depends on whether actual generator voltage is higher or lower than the desired regulated voltage. The signal on line 110 will control the pulse-width of the field voltage by controlling the consecutive on-off states of field controlling transistor 42. The output signal that controls the switching of transistor 42 is developed on line 116 of circuit 90.

The line 118 applies pulses to circuit 90, the frequency of which are related to engine and generator speed. The voltage on line 118 stays continuously in one state when the generator is not rotating. The circuit 90 utilizes the signal on line 118 to develop a signal on line 112 (high or low) that indicates whether or not the rotor of the generator is rotating or, in other words, whether or not the engine is driving the generator. The signal on line 118 is also utilized by circuit 90 to develop a signal on line 114 that indicates whether or not engine and generator speed are above a predetermined speed.

With the foregoing in mind, the circuit 90 of FIG. 5 will now be described in more detail. The circuit 90 has an up-down counter 270 which is connected to a sample and hold circuit 272. The sample and hold circuit 272 is connected to line 110 and hence responds to the output of set point comparator 168. The output of the sample and hold circuit 272 is coupled to up-down counter 270 and to an output latch 274 by line 276. The output of latch 274 on line 116 determines the switching state (on or off) of field controlling transistor 42. The up-down counter 270 is connected to a down counter 278 by seven lines 280. The output of down counter 278 is coupled to sample and hold 272 by line 282 and to output latch 274 by line 284. A synchronization pulse generator 286 is coupled to down counter 278 by line 288 and to output latch 274 by line 290. The system of FIG. 5 has a digital tachometer 292 that feeds rotation line 112 and high speed line 114. Another output of tachometer 292 is connected to up-down counter 270 by a so-called engine stall signal line 294. The tachometer 292 receives engine speed pulse information from a digital filter 296 that is coupled to tachometer 292 by line 298. The input of digital filter 296 is connected to line 118.

The system of FIG. 5 has a clock square wave oscillator 300, the output of which is connected to a master frequency divider 302. This divider has thirteen outputs, shown in FIG. 6 and identified as $MQ_1$ through $MQ_{13}$, some of which are not utilized. The output frequency of oscillator 300 is designated as $\phi_m$ and this signal may have such a frequency that a pulse edge is developed every 10 microseconds. The pulses developed at the output terminals of the divider 302 are delayed from the occurrence of a $\phi_m$ pulse by predetermined time periods. The amount of time delay progressively increases from $MQ_1$ to $MQ_{13}$ and may be respectively 20 microseconds, 160 microseconds, 1.28 milliseconds, 2.56 milliseconds, 5.12 milliseconds, 20.48 milliseconds and 81.92 milliseconds at respective output terminals $MQ_1$, $MQ_4$, $MQ_7$, $MQ_8$, $MQ_9$, $MQ_{11}$ and $MQ_{13}$, shown in FIG. 6. The divider 302 is arranged such that successive output terminals have a frequency that is one-half the frequency of the preceeding terminal. Thus, the frequency at terminal $MQ_2$ is one-half the frequency of $MQ_1$ and so on.

In FIG. 5, one output terminal $MQ_{11}$ is shown connected to counter 270 by a line 304. In FIG. 6, divider terminal $MQ_{13}$ is shown connected to flip-flop 436 by a line 440. The line 304 in FIG. 5 and the line 440 in FIG. 6 represent one connection between one output terminal of the divider 302 and one element in the system. In order to simplify the drawings, other connections between the terminals of divider 302 and other circuit elements have not been illustrated by lines. It is to be understood that the short lines in the systems of FIGS. 5 and 6, that have an MQ designation, are connected to a like MQ output terminal of divider 302 and that a line identified as $\phi_m$ is connected to the output of oscillator 300 which is $\phi_m$.

Before proceeding to a detailed description of FIG. 6, a general description of the operation of the voltage regulator will now be set forth. The down counter or presettable down counter timer 278, at a specific time in the system cycle, is loaded with the data (binary number) then existing in up-down counter 270. The counter 278 is then decremented or counted down until it is clear. The time span, from when the down counting of down counter 278 starts until counter 278 is empty, is identically equal to the time duration that field controlling transistor 42 is biased conductive to energize field winding 14. Putting it another way, the transistor 42 is biased conductive by the system as the down counter counts down to the empty state. When counter 278 reaches the empty state, field controlling transistor 42 is biased nonconductive and will remain nonconductive, until a subsequent time in the system cycle, when down counter 278 is again loaded from up-down counter 270. The regulator thus provides constant frequency pulse width modulation of the field current, that is, the pulse width or the on time period of field controlling transistor 42 is varied and the consecutive on times of transistor 42 occurs at a constant frequency. It will be evident, from the foregoing, that the down counter 278 repetitively translates the count that is in counter 270 to a pulse width of field voltage that is a function of the magnitude of the count in counter 270 at the time that the count in counter 270 is loaded into the down counter. Putting it another way, the count in counter 270 is repetitively sampled and each time that counter 270 is sampled the pulse width of field voltage is controlled to be a function of the count in counter 270 at the time it was sampled.

The magnitude of the count (binary number) that is in up-down counter 270 is varied in accordance with the magnitude of the voltage across battery 36. When the voltage applied to the battery is above a desired or regulated value the up-down counter 270 is decremented or counted down and when the voltage applied to the battery is below the desired regulated value the up-down counter 270 is incremented or counted up. Assuming the voltage to be below the regulated value, the up-down counter 270 will count up substantially continuously and the magnitude of the count in counter 270 will be periodically loaded into down counter 978 with the result that pulses of field voltage will be developed, the pulse width of which progressively increase as the up-down counter continues to count up. The progressively increasing pulses of field voltage will cause the output voltage of generator 10 to increase and eventually the voltage applied to battery 36 will exceed the desired regulated value. When this happens, the up-down counter is decremented or counted down and at the same time the field controlling transistor 42 is biased nonconductive to cutoff field current. When battery voltage exceeds the regulated voltage the transistor 42 is maintained nonconductive and the up-down counter continues to decrement. With field current cutoff the output voltage of generator 10 decreases and eventually the voltage applied to battery 36 will drop below the desired regulated value. When this happens, the field winding 14 will be energized at a pulse width that corresponds to the decremented count then in up-down counter 270 and the up-down counter 270 is now incremented or counted up. The reason for maintaining output transistor 42 biased nonconductive, when generated voltage is too high, is to prevent an over-voltage from being generated when motor vehicle loads are suddenly removed or disconnected from the generator. When the up-down counter 270 is full, the binary number stored therein corresponds to maximum field voltage pulse width. When counter 270 is clear or has substantially no count field controlling transistor 42 is biased nonconductive to provide zero pulse width. At all values stored in counter 270 between its full and clear states, the pulse width of field voltage varies linearly with the binary number in up-down counter 270.

The voltage regulator of this invention can operate in four different modes, which will now be described. When the speed of the engine that drives the generator exceeds a certain predetermined speed, which is higher than the idle speed of the engine, the voltage regulator of this invention operates in what will be termed a first mode of operation. In this first mode of operation, the up-down counter 270 is incremented and decremented in a manner that has been described so as to control the pulse width of the field voltage to thereby maintain the desired regulated output voltage. In this first mode of operation, the frequency at which the counter 270 is incremented is the same as the frequency at which it is decremented. In regard to operating in this first mode of operation, which is engine speed related, the system of this invention senses generator speed which of course is related to engine speed. By way of example, it will be assumed in the future description of this invention that operation in this first mode takes place when generator speed exceeds 3000 rpm. If the speed ratio of the belt and pulleys connecting the engine and the generator is assumed to be about 3.5 to 1, this corresponds to an engine speed of about 850 rpm. Thus, assuming these speeds, the signal on high speed control line 114 will have one value when generator speed is above 3000 rpm and another value when generator speed is below 3000 rpm. The predetermined speed (3000 rpm) is one in which the engine speed (850 rpm) is higher than idle speed. The speed values are given by way of example and can be varied to suit the idle speed range of a particular engine and the speed ratio between the engine and generator of a particular vehicle. In any event, the term "predetermined high speed", as used hereinafter, means a generator and engine speed which is higher than engine idle speed for a particular engine.

When engine speed is below the predetermined speed of 850 rpm or, in other words, when the engine speed is in an idle range, the voltage regulator will be operated in a second mode which can also be termed a load response mode. In the second mode of operation, the rate at which the counter 270 is incremented and decremented is reduced as compared to the rate of incrementing and decrementing that occurs in the first mode of operation. The reason for reducing the incrementing and decrementing rate, during this second mode of operation, is to prevent shaking or stalling of the engine when a large electrical load is suddenly applied to the generator. Thus, when a large electrical load is applied the output voltage of the generator drops below the desired regulated value and causes the counter 270 to be incremented to thereby progressively increase the pulse width of the field voltage. Since the incrementing rate in this second mode of operation is less than the incrementing rate when the engine is operating above the idle speed range, field current is slowly increased to thereby slowly fold the electrical load into the engine. Essentially, what happens is that the system slew rate is slowed or in other words, the time rate of change of the field voltage duty cycle is reduced as compared to the first mode of operation. This load response feature is not required when the engine is operating at a speed above the idle speed range since the mechanical inertia of the engine and generator will carry the engine through large electrical load applications. The incrementing rate of counter 270, during this load response second mode of operation, is less than the decrementing rate.

In a third mode of operation, which corresponds to a condition in which the engine is not driving the generator, the field winding is supplied with current at a fixed duty cycle which is sufficient to cause generator voltage to build up once the generator is driven by the engine. This mode of operation can take place during initial starting of the internal combustion engine that drives the generator, that is when the operator of the vehicle initially closes the ignition switch to start the engine. The system of this invention senses the fact that the generator is not being rotated and it then causes the count in the up-down counter to be clamped to a fixed value which corresponds to a fixed field voltage duty cycle which may be, for example 20%. This duty cycle may be called the strobe duty factor.

In a fourth mode of operation, the voltage regulator of this invention is capable of preventing the system from going to full field when the engine that drives the generator is started and then stalls. If the engine is initially started to cause the generator to rotate and the engine subsequently stalls, the system operates the up-down counter 270 to reset it by a pulse. The counter will then increment back up to the field strobe duty factor which has been described above in connection with the third mode of operation.

With the foregoing in mind, the digital system illustrated in FIG. 6 will now be described. In FIG. 6, the legend 1 has been placed adjacent certain flip-flops, for example the D-terminal of flip-flop 380. This indicates that the particular terminal of a flip-flop is at a one level or connected to positive voltage.

The output of the set point comparator 168 is applied to the D terminal of a negative edge triggered D-type flip-flop 310. This flip-flop corresponds to the sample and hold block 272 illustrated in FIG. 5. The flip-flop 310 is connected to a line or conductor 312 and the Q terminal of flip-flop 310 is connected to the UP terminal of up-down counter 270 by conductor 314. The logic level (high or low) on line 314 is such as to set counter 270 in an up counting mode when generator voltage is below the desired regulated value and in a down counting mode when generator voltage is above the regulated value. The conductor 314 is connected to conductors 316 and 318.

The conductor 316 is connected to a D-type flip-flop 320 having its Q output connected to line 116 and its R terminal connected to line 322. The logic levels of lines 314 and 316 and that of the Q output of flip-flop 320 are such that a signal is developed on line 116 that causes field controlling transistor 42 to be biased nonconductive when the voltage applied to the battery is above the desired regulated value. The transistor 42 is maintained nonconductive as long as the voltage across the battery is above the desired regulated value and at this time the counter 270 is decremented.

The conductor 318 is connected to one input of AND gate 324 and to one input of AND gate 326 via inverter 328. The output of AND gates 324 and 326 are connected to the inputs of an OR gate 330, the output of which is connected to the D-terminal of D-type flip-flop 332. The Q output of flip-flop 332 is connected to up-down counter 270 and applies pulses to counter 270 to cause the counter to count up or down at the frequency of the pulses applied thereto from flip-flop 332.

The AND gate 324 has an input connected to the output of OR gate 334 which in turn has inputs connected respectively to AND gates 336 and 338. One input of AND gate 336 is connected to the $MQ_{11}$ terminal of the master divider 302 and the other input of AND gate 336 is connected to line 340 through an inverter. The line 340 is connected to high speed control line 114. The logic level of the signal on line 114 and hence on line 340 depends on whether or not generator speed and hence engine speed is above or below the predetermined speed. One of the inputs of AND gate 338 is connected to line 340 and its other input is connected to master divider terminal $MQ_7$.

The AND gate 326 has an input connected to the output of OR gate 344 which in turn has inputs connected respectively to AND gates 346 and 348. One input of AND gate 346 is connected to master divider terminal $MQ_9$ and its other input terminal is connected to line 340 by an inverter. The AND gate 348 has one of its inputs connected to master divider terminal $MQ_7$ and its other input connected to line 340.

The output terminals $Q_0$–$Q_6$ of counter 270 are connected as seven inputs to a NAND gate 350. One of the lines connecting the counter 270 and NAND gate 350 includes an inverter 352. The output of NAND gate 350 is connected to one input of AND gate 354 which has an output connected to one of the inputs of OR gate 356. The other input to AND gate 354 is connected to line 358 which in turn is connected to rotation signal developing line 112. The logic level of the signal on line 112 and hence on line 358 depends upon whether or not the generator is rotating or in other words, whether or not the engine is driving the generator. The other input of OR gate 356 is connected to the output of AND gate 360 and the output of OR gate 356 is connected to one of the inputs of AND gate 324. One of the inputs of AND gate 360 is connected to line 358 via an inverter and its other input is connected to line 362 that in turn is connected to the output of NAND gate 364. One of the inputs of gate 364 is connected to the $Q_4$ output terminal of counter 270 and its other input terminal is connected to $Q_3$ output terminal of counter 270.

One of the input terminals of AND gate 326 is connected to the output of a NOR gate 366 by line 368. The NOR gate 366 has seven separate inputs connected respectively to output terminals $Q_0$–$Q_6$ of counter 270. The connection between terminal $Q_0$ and one of the inputs of gate 366 includes an inverter 367.

The output terminals $Q_0$–$Q_6$ of counter 270 are connected to respective input terminals $P_0$–$P_6$ of down counter 278. The $DQ_0$–$DQ_6$ output terminals of down counter 278 are connected as separate inputs to a NOR gate 370. The output of NOR gate 370 is connected to line 322, to line 372 via inverter 374 and to sample and hold flip-flop 310 via inverter 374 and line 312. The line 372 is connected to one input of AND gate 376, the output of which is connected to down counter 278. The other input of AND gate 376 is connected to master divider terminal $MQ_1$.

The flip-flops 380, 382 and 384 are connected in a manner illustrated in FIG. 6. Flip-flop 380 is connected to $MQ_8$ and flip-flops 382 and 384 are connected to $\phi_m$. Flip-flops 382 and 384 are connected to the input terminals of an AND gate 386. The output of AND gate 386 is connected to line 388 which in turn is connected to flip-flop 332. The $Q_B$ terminal of flip-flop 384 is connected to the LOAD terminal of down counter 278 and to flip-flop 320 by line 390. The elements that have just been described correspond to synchronization pulse generator 286 shown in FIG. 5. These elements synchronize the circuit 90 and determine the fundamental period of the field voltage modulation.

The digital filter 296 is illustrated as a block in FIG. 6 and it has an input connected to relay square conductor 118. The output of digital filter 296 is applied to conductor 404 which in turn is connected to flip-flop 406. The flip-flops 406, 408, 410, 412 and 414 form part of a tachometer circuit which is shown in block diagram form in FIG. 5 and identified by reference numeral 292. These flip-flops are all D-type flip-flops and are identical. For convenience of illustration, flip-flops 408–414 do not have legends but it is to be understood that they are identical with flop-flop 406. The square wave input to the digital filter 296 on line 118 is not a smooth, continuous function but rather is noisy. This noisy signal is conditioned in the digital filter 296 and if a glitch occurs and is present for less than a minimum duration it is ignored. If it is greater than this minimum it is passed on to the tachometer.

Flip-flops 408, 410, 412 and 414 are connected to the inputs of a NAND gate 416. The output of NAND gate 416 is connected to flip-flop 418. Flip-flops 418 and 420 are so-called high speed flip-flops since they determine the logic level (high or low) applied to conductor 114. Thus, the Q terminal of flip-flop 420 is connected to conductor 114. The R terminal of flip-flop 418 is connected to line 422 and hence to the R terminals of flip-flops 406–414.

Flip-flops 424 and 426 are so-called rotation signal developing flip-flops since they determine the logic level (high or low) applied to rotation conductor 112. The signal on conductor 112 depends upon whether or not the generator is rotating. Conductor 112 is connected to the Q terminal of flip-flop 426 and is connected to a conductor or line 428.

The conductor 428 is connected to flip-flop 430. This flip-flop, together with flip-flop 432, provide a stall signal on line 434 under certain conditions of operation. The line 434 is connected to the RESET terminal of up-down counter 270. Flip-flop 432 receives the $\phi_m$ signal as is indicated in FIG. 6.

Flip-flops 436 and 438 generate a time window so that the tachometer counts incoming edges of the voltage pulses on line 404. Flip-flop 438 has the $\phi_m$ signal applied thereto. Flip-flop 436 is connected to the output terminal $MQ_{13}$ of master divider 302 by line 440. A line 442 connects flip-flop 436 to flip-flops 426 and 420.

The operation of the digital system illustrated in FIG. 6 will now be described in the various modes of operation of the voltage regulator. Assuming that the engine is driving the generator at a speed that is above the predetermined speed of 3000 rpm and further assuming that the voltage applied to the battery by the bridge rectifier of the diode-rectified alternating current generator is below the desired regulated value, the logic level on conductor 314 will be such as to set the counter 270 in an up-counting mode. During this mode of operation, the signal on high speed signal conductor 114 is applied to AND gates 348 and 338 via conductor 340. Since generator speed is above the predetermined speed, the logic level on conductor 340 is such as to cause AND gates 338 and 348 to pass signals $MQ_7$ to AND gates 324 and 326. At this time the logic level on conductor 314 is such as to cause the AND gate 324 to be biased conductive whereby pulses at the frequency of the $MQ_7$ signal are counted up by the counter 270. As the counter 270 counts up, its count is periodically loaded into the down counter 278 due to the periodic load signal developed at conductor 390. The down counter is then down counted by the MQ$_1$ signal and, as previously explained, field voltage is applied for the time period that the down counter 278 is counting down. When the down counter 278 has completely counted down, a signal is developed by NOR gate 370 which is applied to flip-flop 310 via line 312. This triggers the sample and hold flip-flop 310. The reason for this feature is that the output of the alternating current generator is extremely noisy due to its ripple and the switching of the field current and accordingly taking an instantaneous snapshot of the voltage applied to the battery is difficult. When field voltage is applied it exhibits a ringing phenomenon so, depending upon when the sample and hold 310 flip-flop is triggered, the information could be good or bad. The point at which maximum stability is observed is when the ringing has been damped but field voltage is still applied. This occurs when the down counter 278 decrements to a clear state and therefore this is when the sample and hold flip-flop 310 is triggered.

Assuming that the voltage regulator is operating in the so-called first mode of operation (engine speed higher than a predetermined speed) the counter 270 will continue to count up as long as the voltage applied to the battery is below the regulated value and the down counter 278 will continue to be loaded and counted down to determine the field voltage pulse width. As long as counter 270 is counting up, the pulse width of consecutive field voltage pulses will progressively increase. It is noted that each time the down counter counts down to zero the sample and hold flip-flop 310 samples the then existing voltage (high or low) on conductor 110 and then determines whether the counter 270 should count up or down. In summary, and at the expense of some reiteration, the elements shown in FIG. 6 that determine the output on line 116 provide an output latch shown as a block 274 in FIG. 5. This output latch takes the time information from the down counter time 278 and the output from the sample and hold flip-flop 310 and then outputs a pulse that controls the on-time or pulse width of field controlling transistor 42. At a periodic interval the output latch is set and is then reset when the down counter timer 278 decrements to zero. When the output latch is set, the down counter timer 278 is loaded from up-down counter 270. When the counter 278 is decremented to its empty state, it generates a pulse which, after a time delay, biases transistor 42 nonconductive and triggers the sample and hold flip-flop 310. The sample and hold flip-flop 310 is triggered to sample the voltage level on conductor 110 before transistor 42 goes nonconductive with the result that the voltage on conductor 110 is sampled at a time when field voltage is still applied. As previously mentioned, this type of operation tends to provide maximum stability in that battery voltage is sampled when ringing of the field voltage has been damped and while field voltage is still applied. The time period between the time that down counter 278 reaches zero count and shutoff of transistor 42 may be several microseconds and how this is accomplished is described hereinafter.

As long as battery voltage is below the desired regulated value the pulse width of the field pulses progressively increase causing the output voltage of the generator to increase. When the voltage applied to the battery increases to a point where it exceeds the desired regulated value, the signal on line 110 changes its state or logic level and it now, through flip-flop 310, sets the up-down counter 270 to a down counting mode. The signal on line 314 now causes the field controlling transistor 42 to be biased nonconductive and is applied to conductor 318 so that AND gate 324 now blocks the MQ$_7$ signal from AND gate 338 and AND gate 326 passes the MQ$_7$ signal from AND gate 348. Accordingly, the up-down counter 270 is counted down at the frequency of the MQ$_7$ signal. Thus, the counter 270 is counted down at the same frequency that it was previously counted up, namely the frequency of the MQ$_7$ signal. As the counter 278 is being counted down, the down counter 278 is periodically loaded and counted down but it has no effect on flip-flop 320 because the signal on line 314 is applied to the D input of flip-flop 320 via line 316 to maintain flip-flop 320 in such a state as to maintain field controlling transistor 42 nonconductive. Counter 270 continues counting down and eventually the voltage applied to the battery will decrease to a value below the regulated value whereupon the pulse width of the field voltage will be determined by the decremented count value then in counter 270. Counter 270 will now be incremented and the pulse width of consecutive field voltage pulses will be consecutively increased.

The so-called second mode of operation, which has previously been generally described, is a mode of operation wherein engine speed is below a predetermined value (for example 850 rpm) and should generally be in the idle speed range of the engine. This mode of operation can also be termed the load response mode, as has been previously described. In this mode of operation, both the rate of up-counting and down-counting of up-down conter 270 is reduced as compared to the counting rates (MQ$_7$) used during the first mode of operation. When engine speed drops below the predetermined value the signal on high speed line 114 changes its state or level. This signal is applied to line 340 and it causes gate 336 to pass the MQ$_{11}$ signal and causes gate 346 to pass the MQ$_9$ signal. Accordingly, up-down counter 270 is counted up at the frequency of MQ$_{11}$ signal and is counted down at the frequency of the MQ$_9$ signal. The frequencies of MQ$_{11}$ and MQ$_9$ are both lower than the frequency of MQ$_7$ and the frequency of MQ$_{11}$ is lower than the frequency of MQ$_9$. Accordingly, up-down counter 270 is counted up and down at a lower rate in this second mode of operation as compared to the first mode of operation to provide load response control. Moreover, in this second mode of operation, counter 270 is counted up (MQ$_{11}$) at a lower rate than it is counted down (MQ$_9$)

The so-called third mode of operation is a mode of operation wherein the generator is not rotating or in other words is not being driven by the engine. One condition of operation in which the generator is not being rotated is a situation in which the operator of the motor vehicle initially closes the ignition switch and causes the starter to be energized to crank the engine. In this mode of operation, the pulse width of the field voltage is maintained at a fixed minimum pulse width or duty cycle which may be, for example a 20% duty cycle. This minimum duty cycle has been called the field strobe duty factor and is implemented by placing a clamp on the up-down counter 270 when the generator is not rotating. Thus, the rotation signal line 112 is connected to conductor 358 which in turn is connected to one input of AND gate 354 and to one input of AND gate 360 through an inverter. The other input of AND gate 360 is connected to the output of NAND gate 364.

Counter 270 is counted up by the $MQ_{11}$ signal but when the counter 270 attains a predetermined count the output of NAND gate 364 is such that it causes gate 360 to apply a signal to AND gate 324 to cause gate 324 to prevent further up-counting of counter 270 by the $MQ_{11}$ pulses. Counter 270 therefore is clamped in a predetermined up-count state and this fixed count is then used to set the fixed pulse width (20% duty cycle) of the field voltage. The down counter 278 is therefore loaded with the fixed maximum duty cycle count in counter 270 and is counted down to provide a fixed maximum duty cycle field voltage pulse to the field winding. In this manner, consecutively occurring pulse width voltage pulses are applied to field winding 14 during this third mode of operation.

When the engine starts to drive the generator, the logic level on line 112 changes its state and causes the system to operate in the second mode of operation, that is, in the load response mode. When the engine is accelerated to a speed that exceeds the predetermined high speed, that is above the idle speed range, the logic level of line 114 changes its state to cause the system to operate in the first mode.

The fourth mode of operation can be termed the stall controlled mode. When the engine starts to drive the generator, a rotation signal is developed on line 112 which causes pulses to be applied to counter 270, the frequency of which depend on whether or not engine speed is above or below the predetermined high speed. If the engine should now stall, the generator is no longer being driven and the signal on the rotation line 112 now changes state. Since the voltage across the battery will now be only battery voltage the sensed voltage is below the regulated value and accordingly field controlling transistor 42 would be biased continuously conductive if this condition were allowed to persist. To prevent this, the logic of the system is arranged such that if after rotation is sensed (rotation signal on line 112) and the signal on line 112 changes its state to indicate no rotation (stalled engine) the up-down counter 270 is reset by a pulse developed on line 434 that is connected to the RESET terminal of up-down counter 270. The up-down counter will now increment back up to the field strobe duty factor (20%) so that the field is energized at the minimum duty in the same manner as the third mode of of operation that has been described.

In regard to the pulse width modulation of field voltage, the basic timing period is the time period between the consecutive loading pulses on line 390 since each time a loading pulse occurs the output transistor 42 is biased conductive. The percentage of this time period between loading pulses that transistor 42 is biased conductive (count down time of counter 278) corresponds to the percent duty cycle. The load pulses on line 390 occur at a constant frequency with equal time periods between consecutive loading pulses.

The up-down counter 270 has an upper clamp provided by inverter 352 and logic elements associated therewith and a lower clamp provided by inverter 367 and logic elements associated therewith. These clamps prevent counter roll over and lock out the counter clock signals at counter values of zero plus and minus one count (... 111 and ... 001). Thus, the counter is not allowed to count up to a full state and when it does count up to the magnitude allowed by the upper clamp the magnitude will be such that the duty cycle of field voltage may be $127/128 \times 100$ percent or about 99%.

With a 99% duty cycle, the off time of transistor 42 is 1% so that for 1% of the basic time period (time between load pulses on conductor 390) the transistor is biased nonconductive. When transistor 42 is biased nonconductive the voltage doubler capacitor 120 is charged by the voltage doubler circuit shown in FIG. 4. The 1% off time is sufficient to allow capacitor 120 to be completely charged. The upper clamp on counter 270 therefore assures that there will a sufficient time to charge capacitor 120 when the system is operating at the maximum duty cycle of 99%.

The minimum duty cycle provided by the lower clamp can be about $1/128 \times 100$ percent or about 0.7%. As previously mentioned, there is a time delay of several microseconds between the time that sample and hold flip-flop 310 is triggered to sample the voltage level (high or low) on conductor 110 and the time that output transistor 42 is biased nonconductive so that the voltage on conductor 110 is sampled while field voltage is still applied. This time delay in biasing output transistor 42 nonconductive is caused by flip-flop delays and by the gate capacitance of field effect transistor 42.

When the fail safe comparator 164 (FIG. 2) is controlling the system, due to a disconnection of bridge rectifier terminal 24 from the battery 36 and with conductor 52 properly connected to the system, the voltage level sensed by conductor 52 is only the battery voltage of 12 volts. Since this is below the desired regulated value of 14 volts the signal on line 110 continuously indicates low battery voltage with the result that up-down counter 270 is set to continuously count up and eventually will count up to its maximum clamped value. This causes the system, insofar as the count in counter 270 is concerned, to try to operate at the maximum field voltage duty cycle of 99% but each time the sensed output voltage at junction 162 exceeds the reference voltage at junction 148 the output of comparator 164 will cause output transistor 42 to be biased nonconductive. Thus the 99% field voltage duty cycle, called for by the count in counter 270, is chopped into shorter field voltage pulse widths or duty cycles by the periodic switching off of output transistor 42.

In the foregoing description of this invention it has been pointed out that the count in up-down counter 270 is periodically loaded into down counter 278 and then counted down. When this loading occurs, the count that is in counter 270 does not change due to the loading of counter 278 but rather counter 270 continues to count up or down as the case may be. Putting it another way, the periodic loading of counter 278 does not affect the magnitude of the count in up-down counter 270.

The purpose of the strobe duty cycle (20% duty cycle) is to limit the current that transistor 42 must handle during the third and fourth modes of operation that have been described.

In regard to the under-voltage comparator 170, it is noted that the voltage applied to its negative terminal from junction 160 is substantially flat temperature compensated, that is it does not vary substantially with changes in temperature.

The embodiments of the invention in which an exclusive property or privilege is claimed are defined as follows:

1. The method of regulating the output voltage of a generator that has a field winding and an output winding, the steps comprising, sensing the magnitude of the output voltage of said output winding, comparing the sensed voltage with a reference voltage, incrementing a counter when the sensed voltage is lower than the reference voltage and decrementing the counter when sensed voltage is higher than the reference voltage, repeatedly sampling the magnitude of the count in the counter at a predetermined frequency, energizing said field winding each time the counter is sampled with a voltage pulse the pulse width of which is a function of the magnitude of the count in the counter at the time that the counter is sampled and during the time that the sensed voltage is lower than the reference voltage, and maintaining said field winding deenergized when said sensed voltage is higher than said reference voltage while at the same time decrementing said counter.

2. The method of regulating the output voltage of a generator that has a field winding and an output winding, the steps comprising, sensing the magnitude of the output voltage of said output winding, comparing the sensed voltage with a reference voltage to develop a control signal that has a first magnitude when the sensed voltage is lower than the reference voltage and a second different magnitude when the sensed voltage is higher than the reference voltage, periodically sampling the control signal and holding the value of the signal that was sampled, incrementing a counter when the voltage that is sampled and held has said first magnitude and decrementing the counter when the voltage that is sample and held has said second magnitude, repeatedly sampling the magnitude of the count in the counter at a predetermined frequency, energizing said field winding each time the counter is sampled with a voltage pulse the pulse width of which is a function of the magnitude of the count in the counter at the time that the counter is sampled and during the time that the sensed voltage is lower than the reference voltage, and maintaining said field winding deenergized when said sensed voltage is higher than said reference voltage while at the same time decrementing said counter.

3. The method of regulating the output voltage of a generator that has a field winding and an output winding, the steps comprising, sensing the magnitude of the output voltage of said output winding, comparing the sensed voltage with a reference voltage to develop a control signal that has a first magnitude when the sensed voltage is lower than the reference voltage and a second different magnitude when the sensed voltage is higher than the reference voltage, periodically sampling the control signal and holding the value of the signal that was sampled, incrementing a counter when the voltage that is sampled and held has said first magnitude and decrementing the counter when the voltage that is sample and held has said second magnitude, repeatedly sampling the magnitude of the count in the counter at a predetermined frequency, at least at times periodically energizing said field winding with consecutive occurring voltage pulses the pulse width of a pulse being a function of the magnitude of the count in the counter at the time that the counter is sampled, and controlling the sampling of said control signal such that said control signal is sampled at a time when said field winding is energized.

4. The method of regulating the output voltage of a diode-rectified alternating current generator that has an output winding and a field winding and wherein the generator is driven by the engine of a motor vehicle, the steps comprising, sensing the output voltage of the generator, comparing the sensed voltage with a reference voltage, incrementing a counter when the sensed voltage is below the reference voltage and decrementing the counter when sensed voltage is higher than the reference voltage, repeatedly sampling the magnitude of the count in the counter at a predetermined frequency, each time the counter is sampled energizing the field winding of the generator with a voltage pulse the pulse width of which is a function of the magnitude of the count in the counter at the time that the counter is sampled and during the time that the sensed voltage is lower than the reference voltage, maintaining said field winding deenergized when said sensed voltage is higher than said reference voltage while at the same time decrementing said counter, and causing the rate of incrementing and decrementing of said counter to be lower at engine speeds below a predetermined speed than it is at engine speeds above said predetermined speed.

5. The method of regulating the output voltage of a diode-rectified alternating current generator that has an output winding and a field winding and wherein the generator is driven by the engine of a motor vehicle, the steps comprising, sensing the output voltage of the generator, comparing the sensed voltage with a reference voltage, incrementing a counter when the sensed voltage is below the reference voltage and decrementing the counter when sensed voltage is higher than the reference voltage, repeatedly sampling the magnitude of the count in the counter at a predetermined frequency, each time the counter is sampled energizing said field winding with a voltage pulse the pulse width of which is a function of the magnitude of the count in the counter at the time that the counter is sampled and during the time that the sensed voltage is lower than the reference voltage, and limiting the up count that can be attained by said counter to a predetermined value when said generator is not being driven by said engine and during the incrementing of said counter whereby when said engine is not driving said generator said field winding is energized with consecutive occurring voltage pulses the pulse width of which corresponds to the limited count attained by said counter.

6. A voltage regulating system for a generator that has an output winding and a field winding comprising, means connected to said output winding for developing a sense voltage that is a function of the magnitude of the output voltage of said output winding, means connected to said output winding for developing a reference voltage, up-down counter means, comparator means responsive to said sense voltage and said reference voltage operative to increment said counter means when the sense voltage is lower than the reference voltage and operative to decrement said counter means when the sense voltage is higher than said reference voltage, a field energizing circuit connected to said output winding comprising a semiconductor switch connected in series with said field winding, means for biasing said semiconductor switch nonconductive when said sense voltage is higher than said reference voltage, means for repeatedly sampling the magnitude of the count in the counter means at a predetermined frequency, and means for biasing said semiconductor switch conductive each time the counter means is sampled for a time period which is a function of the magnitude of the count in the counter means at the time that the counter means is sampled and during the time that the sense voltage is lower than the reference voltage.

7. A voltage regulator for a generator that has an output winding and a field winding comprising, voltage sensing means adapted to be connected to said output winding to develop a sense voltage, means adapted to be connected to said output winding for developing a reference voltage, a semiconductor switch adapted to be connected in series with the field winding of the generator, counter means, comparator means responsive to said sense voltage and said reference voltage operative to increment said counter means when the sense voltage is lower than the reference voltage and operative to decrement said counter means when the sense voltage is higher than said reference voltage, means for biasing said semiconductor switch nonconductive when the sense voltage is higher than said reference voltage, means for repeatedly sampling the magnitude of the count in the counter means at a predetermined frequency, and means for biasing said semiconductor switch conductive each time the counter means is sampled for a time period which is a function of the magnitude of the count in the counter means at the time that the counter means is sampled and during the time that the sense voltage is lower than the reference voltage.

8. A motor vehicle electrical system comprising, an alternating current generator having an output winding and a field winding, rectifier means connected to said output winding, means connecting the engine of the vehicle to the rotor of the generator whereby the engine drives the generator, a field energizing circuit for energizing said field winding connected to said output winding comprising a semiconductor switch connected in series with said field winding, means connected to said rectifier means for developing a sense voltage that is a function of the output voltage of said rectifier means, means connected to said output winding for developing a reference voltage, counter means, comparator means responsive to said sense and reference voltages and coupled to said counter means for incrementing said counter means when the sense voltage is lower than the reference voltage and for decrementing said counter means when the sense voltage is higher than said reference voltage, means for biasing said semiconductor switch nonconductive when the sense voltage is higher than the reference voltage, means for repeatedly sampling the magnitude of the count in said counter means at a predetermined frequency, means for biasing said semiconductor switch conductive each time the counter means is sampled for a time period which is a function of the magnitude of the count in the counter means at the time that the counter means is sampled and during the time that the sense voltage is lower than the reference voltage, control means for controlling the rate that said counter means is incremented and decremented, means for developing a speed signal that is a function of engine speed, and means coupling said speed signal to said control means such that the rate that said counter means is incremented and decremented is lower at engine speeds below a predetermined speed than it is at engine speeds above said predetermined speed.

9. A voltage regulator for a generator that has an output winding and a field winding comprising, means connected to said output winding for developing a sense voltage that is a function of the output voltage of said output winding, means for developing a reference voltage, a circuit for energizing said field winding connected to said output winding comprising a semiconductor switch connected in series with said field winding, comparator means responsive to said sense and reference voltages for developing an output signal of a first magnitude when the sense voltage is less than the reference voltage and for developing an output signal of a second different magnitude when the sense voltage is higher than the reference voltage, sample and hold means for periodically sampling said output signal of said comparator means, counter means, means connecting the output of said sample and hold means to said counter means such that the counter means is incremented when said sampled comparator output signal has said first magnitude and is decremented when said sampled comparator output signal has said second magnitude, means for causing said semiconductor switch to be biased alternately conductive and nonconductive with the time period of conduction being a function of the count in said counter means, and means for causing said sample and hold means to sample said output signal of said comparator means at a time when said semiconductor switch is conductive and just prior to the time that said semiconductor switch is driven to a nonconductive state whereby the sample and hold means samples the output signal of said comparator means at a time when said field winding is energized.

10. A voltage regulating system for a generator that has an output winding and a field winding comprising, means connected to said output winding for developing a sense voltage the magnitude of which is a function of the output voltage of said output winding, means for developing a reference voltage, comparator means responsive to said sense and reference voltages for developing a control signal that has a first magnitude when said sense voltage is lower than said reference voltage and a second different magnitude when said sense voltage is higher than said reference voltage, a sample and hold circuit, an up-down counter, a down counter connected to said up-down counter, said sample and hold circuit coupled to the output of said comparator to periodically sample said control signal and coupled to said up-down counter for causing said up-down counter to be incremented when the sampled control signal has said first magnitude and causing said up-down counter to be decremented when said sampled control signal has said second magnitude, timing pulse generating means coupled to said down counter for periodically causing the magnitude of the count in the up-down counter to be transferred to said down counter and for causing said down counter to count down to a predetermined state, a field energizing circuit for energizing said field winding connected to said output winding comprising a semiconductor switch connected in series with said field winding, the timing pulses generated by said timing pulse generating means being of constant frequency and defining time periods therebetween of a constant predetermined magnitude, said system being connected such that said semiconductor switch is biased conductive when a timing pulse occurs and remains conductive until said down counter counts down to said predetermined state, the time period that said semiconductor switch remains conductive being a function of the count in said up-down counter when said count is transferred to said down counter and being a percentage of the time period between said timing pulses developed by said timing pulse generating means, and means connecting said down counter to said sample and hold circuit to cause said sample and hold circuit to sample said control signal when said down counter has counted down to said predetermined state.

11. A voltage regulating system for a generator that has an output winding and a field winding comprising, means connected to said output winding for developing a sense voltage the magnitude of which is a function of the output voltage of said output winding, means for developing a reference voltage, comparator means responsive to said sense and reference voltages for developing a control signal that has a first magnitude when said sense voltage is lower than said reference voltage and a second different magnitude when said sense voltage is higher than said reference voltage, a sample and hold circuit, an up-down counter, a down counter connected to said up-down counter, said sample and hold circuit coupled to the output of said comparator means to periodically sample said control signal and coupled to said up-down counter for causing said up-down counter to be incremented when the sampled control signal has said first magnitude and causing said up-down counter to be decremented when said sampled control signal has said second magnitude, timing pulse generating means coupled to said down counter for periodically causing the magnitude of the count in the up-down counter to be transferred to said down counter and for causing said down counter to count down to a predetermined state, a field energizing circuit for energizing said field winding connected to said output winding comprising a semiconductor switch connected in series with said field winding, means for biasing said semiconductor switch nonconductive when said control signal has said second magnitude, the timing pulses generated by said timing pulse generating means being of constant frequency and defining time periods therebetween of a constant predetermined magnitude, said system being connected such that when said control signal has said first magnitude said semiconductor switch is biased conductive when a timing pulse occurs and remains conductive until said down counter counts down to said predetermined state, the time period that said semiconductor switch remains conductive being a function of the count in said up-down counter when said count is transferred to said down counter and being a percentage of the time period between said timing pulses developed by said timing pulse generating means, and means connecting said down counter to said sample and hold circuit to cause said sample and hold circuit to sample said control signal when said down counter has counted down to said predetermined state, the system being so constructed and arranged that said control signal is sampled while said semiconductor switch is conductive to energize said field winding.

12. A voltage regulating system for an alternating current generator that is driven by an engine of a motor vehicle and which supplies the electrical loads on the vehicle comprising, an alternating current generator having an output winding and a field winding, an engine connected to the generator to drive the generator, means connected to said output winding for developing a sense voltage the magnitude of which is a function of the output voltage of said output winding, means for developing a reference voltage, comparator means responsive to said sense and reference voltages for developing a control signal that has a first magnitude when said sense voltage is lower than said reference voltage and a second different magnitude when said sense voltage is higher than said reference voltage, a sample and hold circuit, an up-down counter, a down counter connected to said up-down counter, said sample and hold circuit coupled to the output of said comparator means to periodically sample said control signal and coupled to said up-down counter for causing said up-down counter to be incremented when the sampled control signal has said first magnitude and causing said up-down counter to be decremented when said sampled control signal has said second magnitude, timing pulse generating means coupled to said down counter for periodically causing the magnitude of the count in the up-down counter to be transferred to said down counter and for causing said down counter to count down to a predetermined state, a field energizing circuit for energizing said field winding connected to said output winding comprising a semiconductor switch connected in series with said field winding, means for biasing said semiconductor switch nonconductive when said control signal has said second magnitude, the timing pulses generated by said timing pulse generating means being of constant frequency and defining time periods therebetween of a constant predetermined magnitude, said system being connected such that when said control signal has said first magnitude said semiconductor switch is biased conductive when a timing pulse occurs and remains conductive until said down counter counts down to said predetermined state, the time period that said semiconductor switch remains conductive being a function of the count in said up-down counter when said count is transferred to said down counter and being a percentage of the time period between said timing pulses developed by said timing pulse generating means, means connecting said down counter to said sample and hold circuit to cause said sample and hold circuit to sample said control signal when said down counter has counted down to said predetermined state, the system being so constructed and arranged that said control signal is sampled while said semiconductor switch is conductive to energize said field winding, and means responsive to engine speed for causing the rate that said up-down counter is incremented to be higher when engine speed is above a predetermined value than it is when engine speed is below said predetermined value.

13. A voltage regulating system for an alternating current generator that is driven by an engine of a motor vehicle and which supplies the electrical loads on the vehicle comprising, an alternating current generator having an output winding and a field winding, an engine connected to the generator to drive the generator, means connected to said output winding for developing a sense voltage the magnitude of which is a function of the output voltage of said output winding, means for developing a reference voltage, comparator means responsive to said sense and reference voltages for developing a control signal that has a first magnitude when said sense voltage is lower than said reference voltage and a second different magnitude when said sense voltage is higher than said reference voltage, an up-down counter, a down counter connected to said up-down counter, means responsive to said control signal and coupled to said up-down counter for causing said up-down counter to be incremented when the control signal has said first magnitude and causing said up-down counter to be decremented when said control signal has said second magnitude, timing pulse generating means coupled to said down counter for periodically causing the magnitude of the count in the up-down counter to be transferred to said down counter and for causing said down counter to count down to a predetermined state, a field energizing circuit for energizing said field winding connected to said output winding comprising a semiconductor switch connected in series with said field winding, the timing pulses generated by said timing pulse generating means being of constant frequency and defining time periods therebetween of a constant predetermined magnitude, said system being connected such that said semiconductor switch is biased conductive when a timing pulse occurs and remains conductive until said down counter counts down to said predetermined state, the time period that said semiconductor switch remains conductive being a function of the count in said up-down counter when said count is transferred to said down counter and being a percentage of the time period between said timing pulses developed by said timing pulse generating means, and means operative when said generator is not rotating for incrementing said up-down counter to a limit count of a predetermined magnitude whereby the field is energized at a fixed duty cycle corresponding to the fixed magnitude limit count in said up-down counter.

14. A voltage regulating system for a diode-rectified alternating current generator comprising, an alternating current generator having an output winding and a field winding, rectifier means connected to said output winding having positive and negative direct voltage output terminals one of which is grounded, a field energizing circuit connected across said output terminals comprising in a series connection the drain and source of a field effect transistor and said field winding, the field winding connected between the source of the field effect transistor and the grounded output terminal of said bridge rectifier, a voltage multiplier circuit connected to the output terminals of said bridge rectifier and to the gate of said field effect transistor for at times applying a gate drive voltage to said gate that is higher than the voltage applied to said drain to thereby bias said field effect transistor conductive between its drain and souce, said voltage multiplier circuit comprising a capacitor that is connected to be charged from said bridge rectifier when said field effect transistor is biased nonconductive and which is connected to add to the voltage of the bridge rectifier to provide said gate drive voltage when said field effect transistor is to be biased conductive, means for developing a sense voltage that is a function of the output voltage of said bridge rectifier, means for developing a reference voltage, a counter, means for incrementing said counter when the sense voltage is lower than the reference voltage and for decrementing said counter when the sense voltage is higher than the reference voltage, means for applying a variable control signal to said voltage multiplier that is operative to cause the gate voltage of said field effect transistor to vary such that the field effect transistor is biased either conductive or non-conductive, means coupled to said counter for developing said control signal, said last-named means operative to cause said field effect transistor to be biased alternately conductive and nonconductive with the time period of conduction being a portion of a predetermined time period and wherein the time period of conduction is a function of the magnitude of the count in said counter, and means for limiting the count that the counter can attain to a magnitude that will permit the time period that the field effect transistor is biased nonconductive to be long enough to permit said capacitor to fully charge.

15. A voltage regulating system for a motor vehicle electrical system comprising, an alternating current generator having an output winding and a field winding, an engine connected to said generator for driving said generator, rectifier means connected to said output winding for supplying direct voltage to the electrical loads of said motor vehicle, means connected to the output of said rectifier means for developing a sense voltage, means for developing a reference voltage, counter means, means for incrementing said counter means when said sense voltage is lower than said reference voltage and decrementing said counter means when said sense voltage is higher than said reference voltage, a circuit connected to said output winding for energizing said field winding comprising a semiconductor switch connected in series with said field winding, means for causing said semiconductor switch to be biased alternately conductive and nonconductive with the time period of conduction being a function of the magnitude of the count in said counter means, means operative when said generator is not rotating for causing said counter means to operate in a strobe mode such that said counter means is counted up to a fixed predetermined limit count value whereby when said generator is not rotating the conductive time period of said semiconductor switch has a fixed value corresponding to the fixed predetermined limit count value in said counter means, and means responsive to a condition of operation wherein said engine drives said generator and subsequently stalls for causing said counter means to operate in said strobe mode.

16. A voltage regulating system for a diode-rectified alternating current generator that feeds the electrical loads on a motor vehicle including a storage battery comprising, an alternating current generator having an output winding and a field winding, a bridge rectifier connected to said output winding having direct voltage output terminals, a battery connected to the output terminals of the bridge rectifier, a field energizing circuit connected to said output winding comprising a semiconductor switch connected in series with said field winding, a voltage comparator operative to compare a sense voltage on a sense conductor with a reference voltage and coupled to said semiconductor switch for biasing the semiconductor switch conductive when the sense voltage is lower than the reference voltage and biasing the semiconductor switch nonconductive when the sense voltage is higher than the reference voltage, a first voltage sensing circuit comprising a first voltage divider that has a first temperature sensitive circuit element connected across said battery with one end of the first sensing circuit connected to the battery, a second voltage sensing circuit comprising a second voltage divider that has a second temperature sensitive circuit element connected across the output terminals of said bridge rectifier with one end of said second sensing circuit connected to one of the output terminals of said bridge rectifier, means connecting a junction of said first sensing circuit to said sense conductor when the magnitude of the voltage applied to said first sensing circuit is above a predetermined value and means connecting a junction of said second sensing circuit to said sense conductor when the voltage applied to said first sensing circuit is below said predetermined value whereby the sense voltage that is applied to said comparator is either a voltage developed by said first sensing circuit or a voltage developed by said second sensing circuit.

* * * * *